United States Patent

Noehl et al.

(10) Patent No.: US 8,607,949 B2
(45) Date of Patent: Dec. 17, 2013

(54) DUAL CLUTCH

(75) Inventors: Oliver Noehl, Buehlertal (DE); Ivo Agner, Buehl (DE); Norbert Radinger, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 392 days.

(21) Appl. No.: 13/003,904

(22) PCT Filed: Jun. 29, 2009

(86) PCT No.: PCT/DE2009/000900
§ 371 (c)(1),
(2), (4) Date: Jan. 13, 2011

(87) PCT Pub. No.: WO2010/006577
PCT Pub. Date: Jan. 21, 2010

(65) Prior Publication Data
US 2011/0132712 A1    Jun. 9, 2011

(30) Foreign Application Priority Data
Jul. 14, 2008    (DE) .................... 10 2008 033 033

(51) Int. Cl.
*F16D 25/08*    (2006.01)
*F16D 25/10*    (2006.01)
*F16D 21/06*    (2006.01)

(52) U.S. Cl.
USPC ............... 192/48.606; 192/48.611; 192/48.8; 192/85.49; 192/85.53

(58) Field of Classification Search
USPC ............ 192/48.602, 48.603, 48.606, 48.611, 192/48.618, 48.8, 85.49, 85.53
See application file for complete search history.

(56) References Cited

U.S. PATENT DOCUMENTS

| 2,636,585 | A | * | 4/1953 | Livermore | ............... 192/48.611 |
| 2,700,341 | A | * | 1/1955 | Smirl | ............... 418/25 |
| 2003/0079953 | A1 | | 5/2003 | Carlson et al. | |
| 2011/0114435 | A1 | * | 5/2011 | Noehl | .......... 192/48.1 |

FOREIGN PATENT DOCUMENTS

| DE | 10 2006 057 482 A1 | 6/2008 |
| EP | 0 185 176 A | 6/1986 |
| EP | 0 692 665 A | 1/1996 |
| EP | 1 813 832 A | 8/2007 |
| FR | 2 797 004 A | 2/2001 |

OTHER PUBLICATIONS

Machine translation of FR 2797004 A downloaded from epo.org on Apr. 1, 2013.*

* cited by examiner

*Primary Examiner* — Richard M. Lorence
(74) *Attorney, Agent, or Firm* — Lucas & Mercanti, LLP

(57) ABSTRACT

A dual clutch which has two friction clutches, a central pressure-exerting plate and two pressure plates which are axially movable relative to the pressure-exerting plate with the interposition of the friction linings of two clutch disks, which each mesh with one gearbox input shaft, of actuating devices. The dual clutch is held at the drive-input side, with the dual clutch being supported at the gearbox side by an actuating system, which holds the two actuating devices, for actuating the pressure plates, and with the actuating system being rotatably held on the clutch housing.

37 Claims, 15 Drawing Sheets

DUAL CLUTCH

This application is a 371 of PCT/DE2009/000900 filed Jun. 29, 2009, which in turn claims the priority of DE 10 2008 033 033.7 filed Jul. 14, 2008, the priority of both applications is hereby claimed and both applications are incorporated by reference herein.

The invention relates to a dual clutch with two frictional clutches driven by a drive unit, with a common clutch housing and a contact pressure plate with two contact pressure surfaces fixedly connected to the clutch housing, and with two axially displaceable pressure plates which each face one of the pressure surfaces.

Dual clutches with two frictional clutches, with a clutch housing and a central contact pressure plate fixedly connected to the clutch housing are known. In this connection, the contact pressure plates are axially displaced by actuating devices by radially inwardly axially loading a plate spring or lever elements with a predetermined disconnecting path. Depending on the configuration of the corresponding frictional clutch as a frictional clutch which is forcibly pressed or pulled closed, i.e. is forcibly closed, or as frictional clutch which is forcibly pressed open or pulled open, i.e., forcibly opened, the plate spring or lever elements are supported by means of one-armed or two-armed levers on the clutch housing with the formation of a gear ratio, so that the axial path of the actuating device is longer than the path of the pressure plate from the completely opened state of the frictional clutch, in which no torque is transmitted, to the completely open state in which the maximum torque is transmitted. This leads to actuating systems with actuating devices which, particularly due to the large axial extension, require a large installation space.

Due to the comparatively high weight of dual clutches, the dual clutches are, aside from being mounted on the crank shaft, frequently radially supported on one of the two gear unit input shafts, for example, on the second gear unit input shaft constructed as a hollow shaft and coaxially arranged about the first gear unit shaft. Corresponding support bearings are frequently arranged between the central contact pressure plate and the hollow shaft. In this connection, the hollow shaft, on the one hand, can be subjected to additional loads, such as radially acting weight forces of the dual clutch, and to imbalances, as well as to axially acting forces during the actuation of the dual clutch which requires a correspondingly adjusted construction of the hollow shaft.

Moreover, the excitation of vibrations can be introduced into the dual clutches from the gear unit, for example, during zero crossing during load alternations, so that corresponding damping measures must be provided in the clutch disks.

Also known from the prior art are dual clutches which are received rotatably on the gear unit housing. In order to absorb the actuating forces of the actuating devices, which rest axially on the gear unit housing relative to the dual clutch, and in order to construct the axial actuating paths so as to be movable in a defined manner, the dual clutch is received by means of a fixed bearing on the gear unit housing. Such a configuration requires a partial assembly of the dual clutch on the gear unit and drive sides.

Therefore, it is the object of the invention to propose a dual clutch which is developed in an advantageous manner over the prior art. In particular, an actuating system with reduced installation space is to be proposed.

This object is met by a dual clutch with two frictional clutches driven by a drive unit with a common clutch housing and a contact pressure plate with two contact pressure surfaces, rigidly connected to the clutch housing, as well as two axially displaceable pressure plates each facing a contact pressure surface, wherein between one pressure plate and the respective contact pressure plate each are arranged frictional linings of a clutch disk non-rotatably connected to one gear unit input shaft each of a gear unit for forming a frictional engagement by axially acting on the pressure plates by means of an actuating system clampable to a respective actuating device, so that the actuating system is axially fixedly received relative to the clutch housing. In this connection, the actuating devices are received in a common actuator housing. By integrating the actuating system in the dual clutch, a power flux is created which is closed in itself for actuating the two frictional clutches by introducing the force required for pressing the clutch disks between the contact pressure plates and pressure plates into the clutch housing by the actuating devices. For this purpose, the common actuator housing is axially securely supported, for example, by means of a support bearing, at the clutch housing. In this manner, the dual clutch can be constructed as an independently operating structural unit which can be tested and assembled as a whole. Only the supply of the actuating devices, which may be, for example, slave cylinders to which a pressure can be applied or mechanical elements to which electric motors are applied, is provided to the actuating system from the outside. The actuating housing, or rather the actuator housing thereof, is secured to the clutch housing in a rotatable receiving means at the clutch housing, while the frictional clutches rotate together with the clutch housing. For compensating for this relative movement, the actuating devices act on the direct transfer device for acting on the pressure plates with the intermediate arrangement of actuating bearings. The transfer elements which act directly between the actuating devices and the pressure plates, for example, stiff piston sheets, act on the pressure plates without lever effects by transferring a predetermined travel of the pistons directly to the pressure plates.

The actuator housing may be supported by means of a play fit at the clutch housing and may be centered. For this purpose, between a gear unit input shaft formed as a hollow shaft and the gear unit housing may be formed an annular gap into which an axial projection of the actuator housing axially engages and is centered. In this connection, the dual clutch may be displaceable to a limited extent in the axial direction against the action of an energy storage. In accordance with an advantageous development, the dual clutch may be received by means of a plug-in toothing so as to be secured against rotation and be displaceable to an axially limited extend, wherein an axial displacement of the dual clutch is limited on the gear unit side axially by a stop and the energy storage is arranged at the drive side. In this manner, the dual clutch is floating as it were and can be clamped by the axially effective energy storage, for example a plate spring, against the stop on the gear unit side. In order to be able to compensate for large axial tolerances, and to retain the spring effect in the assembly situation, an axially plastically deformable energy storage may be provided which is plastically deformed during the assembly at the spacing to be used.

For compensating for offsets of the axes of rotation between drive unit and gear unit, the play fit between the actuator housing and the gear unit may be constructed within a predetermined angle so as to be pivotable in an articulated manner. For this purpose, a ballus may be provided at the axial projection of the actuator housing, having a radius the center of rotation of which is located on the axis of rotation of the gear unit input shafts.

The input part of the dual clutch may on the drive side thereof be connected directly to the crank shaft or with the intermediate arrangement of a torsional vibration damper, for example, a two-mass flywheel, with a primary part and a secondary part. In this respect, the plug-in connection may be arranged at the secondary part, i.e., the output part of the torsional vibration damper, while the primary or input part of the two-mass flywheel or the torsional vibration damper may be connected to the drive shaft of the drive unit, for example a crank shaft of an internal combustion engine. Furthermore, the input part of the dual clutch may be supported rotatably on a drive shaft or a structural component fixedly connected to the drive unit and can be connected to the output part of the torsional vibration damper by means of the plug-in toothing so as not to be rotatable. In this manner, a load acting on the radially extending parts and the energy storage optionally arranged in between can be excluded and still a connection of the dual clutch to the output part can be ensured. For this purpose, the mounting of the dual clutch may be effected by means of a friction bearing on the drive shaft, wherein the radially inner friction bearing ring is connected on the drive side, for example, as an angular ring at the drive shaft with the formation of an axial projection as bearing surface and the radially outer bearing ring is formed by an input part of the dual clutch.

In accordance with another embodiment, the dual clutch may be connected on the drive side so as to be axially fixed, for example, to the output part of a torsional vibration damper, such as two-mass flywheel or the drive shaft. In this case, a stop of the play fit on the gear unit side can be omitted. In an advantageous manner, between the dual clutch and the drive shaft for damping the axial and/or tumbling vibrations of the drive shaft, and for compensating offsets, a structural component which is flexible in the axial direction, for example a so-called flexplate may be provided which may be connected as a drive sheet directly to the dual clutch or to the input part of the torsional vibration damper.

One advantageously constructed dual clutch may be threaded onto the gear unit input shafts during the assembly and can be mounted on the gear unit input shafts until the gear unit is mounted on the drive unit until the positive engagement of the drive shaft or a torsional vibration damper is established. It may be advantageous in this connection if the actuator housing is at least during the assembly additionally rotatably supported on a gear unit input shaft. An appropriate bearing can be provided at one of the gear unit input shafts, preferably on the hollow shaft and constructed as needle or sliding bearing which is to at least a limited extent axially displaceable on the hollow shaft. In a preferred manner, the support or the needle or sliding bearing and the support bearing receiving the actuator housing are stacked radially one above the other and arranged axially in line. After the final assembly, the support can absorb a small supporting force of the dual clutch or can form, in an advantageous manner relative to the actuator housing an air gap after the dual clutch has been received on the drive side.

Serving as drive unit may be, for example, an internal combustion engine with a crank shaft and/or an electric machine with a drive shaft. In combination, a hybrid drive may be provided in which alternatively or supplementing each other at least one internal combustion engine and at least one electric machine form the drive unit.

The two frictional clutches are preferably dry single-disk clutches with respectively a metal frictional surface each at the contact pressure plates and at the pressure plates, as well as clutch disks with frictional linings forming counter frictional surfaces. The frictional linings of the clutch disks are preferably equipped with a lining resilience; in addition, the pressure plates are closed axially displaceably, against the effect of energy storage units, such as, for example, plate springs, so that during opening of a frictional clutch the corresponding pressure plate is displaced in the opening direction.

At least one of the two frictional clutches is constructed so as to be self-opening. This means that when the load is removed from the actuating device, the frictional clutch is transferred from the closed state into the open state. Preferably, both frictional clutches are constructed so as to be forcibly closed, i.e., as frictional clutches that are pressed closed or pulled closed by the respective actuating device, so that both frictional clutches are self-opening as soon as an actuating device is no longer operating, for example, due to a defect. For this purpose, an axially acting energy storage may be arranged between the clutch housing and the pressure plate, wherein the energy storage displaces the actuating device which is not under load axially into a position of rest with the frictional clutch being opened. This energy storage unit can be formed of reinforced plate springs which are distributed over the circumference or an additional energy storage means.

By supporting the dual clutch at the gear unit housing, a support of the dual clutch on one of the two gear unit input shafts is avoided, so that these shafts are not subjected to a bending load by the dual clutch and do not require a separate configuration as a result. Moreover, this has the effect that no vibrations, for example, tumbling vibrations, are transmitted from the gear unit into the dual clutch, nor from the dual clutch to the gear unit. The gear unit may be a gear unit with a principal output and an auxiliary output. However, in a preferred manner, the dual clutch is used for a dual clutch gear unit with two partial drive strands for forming a power shift transmission in which one partial drive strand, with the gear unit in gear, transmits torque from the drive unit with the frictional clutch being closed unto the wheels of a motor vehicle and the other drive strand with the frictional clutch being open a subsequent gear is engaged, or after the gear is engaged, is being made available in the engaged state. A shifting takes place by overlapping of the two frictional clutches of the dual clutch, wherein the closed frictional clutch is slippingly opened and the open frictional clutch is slippingly closed, so that during the overlapping over the two partial drive strands, alternating/varying partial torques are transmitted.

It has been found to be advantageous if both frictional clutches are forcibly closed frictional clutches in order to avoid blocking of the dual clutch gear unit when an actuating device is failing, particularly during an overlapping gear shift. Due to the advantageous arrangement of a central contact pressure plate with oppositely arranged pressure plates of the frictional clutch, the actuating paths for closing the frictional clutches are arranged in their function opposite to each other. In this connection, both frictional clutches are advantageously actuated from the gear unit side. For this purpose, a frictional clutch is pressed closed and the frictional clutch facing the drive side is pulled closed by means of tie rods which extend through the gear unit. An alternative embodiment provides for a dual clutch, the pressure plate of which, arranged on the drive side, is actuated by means of a transfer element which engages over the pressure plate outside of the clutch housing. In this connection, the transfer element can directly form the annular piston and engage around the clutch housing radially and axially on the outside and be directly connected to the pressure plate. The clutch housing is arranged radially within or radially essentially on the same level as the connecting points of the transfer elements while connecting with the pressure plate over the circumference thereof alternatingly with the contact pressure plate. For this purpose, the clutch housing and/or the transfer element have appropriate recesses in the areas of fastening to pressure plate or clutch housing.

The actuating devices may be mechanical lever devices which are driven radially from the outside, for example, by an electric motor. Particularly advantageous is a pneumatic or preferably a hydraulic operation of the dual clutch, wherein the actuator housing is configured as a slave cylinder housing in which, for the actuation of one transfer element each, one slave cylinder each is accommodated to which pressure is applied from the outside. The slave cylinders have for this purpose each an annular piston or individual pistons distributed over the circumference which are axially displaceable in a pressure chamber to which pressure can be applied from the outside and actuate the transfer elements with the intermediate arrangement of an actuating bearing.

The pressure chambers of the slave cylinders are acted on by one master cylinder each which is controlled by means of an electric motor via a control device, or by a pump, possibly with the additional contribution of a pressure reservoir, wherein the pump may be operated by the drive unit or by an electric motor. In an advantageous manner, a so-called power pack can be used which switches several pressure circuits via a central pump and corresponding valves, wherein both frictional clutches are actuated and the switching of the gear unit and the circumferential lubrication of the annular space described below can take place.

It may be advantageous if the actuating bearings provided between the actuating device and the transfer elements are formed of needle bearings. Because of the axially smaller axially required installation space, the axial installation space of the entire actuating system can be reduced. The actuating bearings are preferably constructed as ball bearings, such as grooved ball bearings, if a radial load occurs between the running races.

For protecting the annular piston sealing members against wear, the annular pistons may be accommodated in the pressure chamber, or in the housing parts of the actuator housing forming this pressure chamber secured against rotation. For example, axial profiles such as pins may be provided on the stop surfaces on the housing side of the pistons, which pins axially engage in corresponding openings on the end sides of the pressure chambers.

In accordance with one advantageous development, an outwardly sealed annular space may be provided which receives the actuating bearing and a support bearing receiving the actuator housing at the clutch housing. The fluid used in the annular space for lubricating and cooling can be circulated in an outer cooling cycle. In this respect, one advantageous embodiment provides to skim the fluid in the annular space radially on the outside, feed the fluid via the actuator housing to an outer cooling cycle and return to the annular space after being received by the actuator housing. The cooling cycle can be carried out through the gear housing and, if necessary, a separate radiator. In addition, a pump for forced circulation may be provided.

Depending on the construction and installation space circumstances, it may be advantageous to arrange the annular pistons on the same diameter. The number of different structural components can be decreased in an advantageous manner because, for example, annular pistons, actuating bearings, annular piston seals and the like are the same parts. In other embodiments, the axial installation space can be reduced by arranging the annular pistons radially one above the other.

The supply of the slave cylinders with pressure medium for actuating the transfer elements and actuating the frictional clutches takes place through bores in the actuator housing. Moreover, appropriate bores may also be provided as supply and discharge lines for the cooling cycle of the annular space. The supply openings are in communication with supply openings of the pressure supply unit for the slave cylinders. In this connection, a pressure application on the slave cylinders can take place purely hydrostatically by means of a master cylinder, so that for each slave cylinder are only required a supply line and possibly a ventilating line. If the slave cylinders are controlled by means of a volume flow, additionally a discharge line into the sump, for example, the gear oil sump, is necessary.

Particularly advantageous has been proven the use of a supply part which facilitates a transfer of the pressure medium for actuating the slave cylinders from radially outside. Such a supply part can be fastened to the gear housing and may have axially aligned pressure connections which are connectable to corresponding pressure connections of the actuator housing. The connection of the pressure connections can be effected by means of the pipe sections which are sealed with respect to the pressure connections. In this connection, the pressure connections may be arranged on the same diameter as an axial projection of the actuator housing for supporting the dual clutch at the gear housing. The supply of the pressure medium can take place in the case of small diameters in this manner so that also the diameters of the annular pistons of the slave cylinders can be arranged on a small diameter, with the use of more inexpensive structural components.

For compensating for angular offsets due to tolerances between the drive unit and the gear unit, or the rotational axes of drive shaft and gear unit input shafts, the pipe sections may have a receptacle play in the pressure connections. Moreover, the pipe sections may carry out a torque support of the actuator housing relative to the gear housing. The actuator housing can be formed with the supply part axially nested in each other, for example, at least one axial projection of the actuator housing can axially engage over a projection with the pressure connections of the supply part for support at the gear housing. In this manner, the projections form in the circumferential direction contact surfaces, so that a torque support between actuator housing and gear unit can take place also by supporting this contact surface in the circumferential direction. Moreover, for obtaining a compensation of the angular offset, the annular pistons may also be received with play in the corresponding pressure chamber.

In order to prevent leaks of the slave cylinders from the outset, which may be damaging when the frictional surfaces of the frictional clutches become wet, at least one annular piston can have a wiper ring which is axially spaced apart from the annular piston seal. In the case of a leak, this wiper ring can prevent the emergence of pressure medium. In this regard, between the annular piston seal and the wiper ring may be provided a drainage opening through which excessive pressure medium can be discharged into a gear unit sump or into a vessel whose service life is adjusted.

Another advantageous configuration of dual clutch provides for a non-rotational arrangement of the actuator housing on the clutch housing, wherein the actuating devices are designed as slave cylinders arranged in an actuator housing, and pressure medium used for actuation of annular pistons held in pressure chambers of the actuator housing is introduced into the actuator housing by way of rotational operations of a gear unit housing of the gear unit. In this manner, the entire dual clutch rotates with the non-rotational incorporation of all structural components including the actuating system with actuating devices, as one structural unit. Therefore, the support bearing between the clutch housing and the actuator housing and the actuating bearings between the transfer elements and the annular pistons can be omitted, so that there is a savings of cost for structural components as well as an axial installation space and weight are reduced. The rotating actuator housing is supplied by means of a rotational operation with the pressure medium necessary for actuating the slave cylinders. In this connection, the actuator housing can be constructed of two parts for production of the bores and for reasons of assembly.

In order to compensate for the increased actuating forces due to the acceleration of the pressure medium in the pressure chambers due to the centrifugal forces, the pressure chambers may be provided with a centrifugal chamber arranged in parallel and filled with pressure medium.

Due to the omission of the actuating bearing, annular pistons and transfer elements may be connected fixedly to each other and can be made of one part, which is particularly advantageous. The transfer elements may have seals injection-molded onto the transfer elements in the areas of the annular pistons for sealing relative to the pressure chambers. A dual clutch designed in such a way may also be supported by way of a fixed bearing on one of the gear unit input shafts of the gear unit and by way of a loose bearing on the other gear unit input shaft designed as a hollow shaft, instead of being supported in a seat fixed to the housing.

Moreover, a dual clutch according to the concept of the invention may have a clutch housing which is formed of a housing part on the drive side and a housing part on the gear side, wherein both housing parts are fixedly connected to the contact pressure plate, the one on the drive side fixed axially to the drive side and the one on the gear unit side, containing the contact pressure plate and the pressure plates, are pre-assembled on the gear unit side and the housing parts are joined together during the assembly of drive unit and gear unit.

Also included in the inventive concept is a frictional clutch with a clutch housing driven by a drive unit and a contact pressure plate fixedly connected to the clutch housing having a frictional surface and an axially displaceable pressure plate facing the frictional surface, wherein between the pressure plate and the contact pressure plate friction linings of a clutch disk, connected to the gear unit input shaft of a gear unit, can be tensioned for forming a frictional engagement by axially acting on the pressure plate by means of an actuating device, characterized in that the actuating device is axially fixed by means of an actuator housing with respect to the clutch housing. Moreover, the above-described advantageous developments of the dual clutch applicable to the frictional clutch can also be applied to a single clutch.

The invention is explained in more detail with the aid of FIGS. 1-16.

Figure 1:
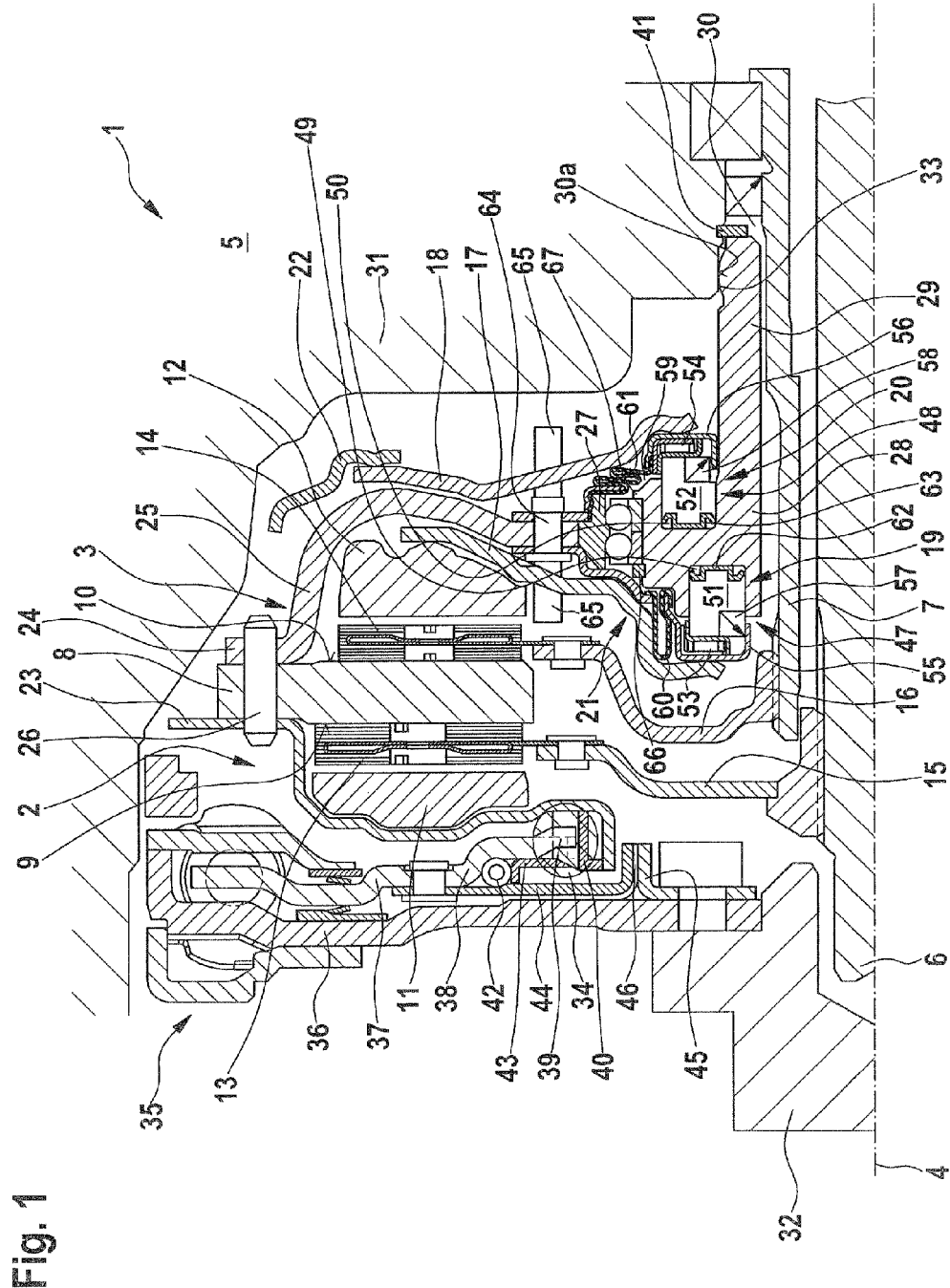
FIG. 1 is a partial sectional view of an embodiment of a dual clutch with a rotatably received actuating system.

FIG. 1 shows the upper part of a dual clutch 1 with frictional clutches 2,3 arranged around a rotational axis 4 of the gear unit input shafts 6,7 of a gear unit 5. The frictional clutches 2, 3 are formed by a central contact pressure plate 8 and pressure plates 11, 12 which are displaceable with respect to one frictional surface 9, 10, each, wherein between the frictional surfaces 9, 10, and the frictional surfaces of the pressure plates 11, 12 facing the frictional surfaces 9,10 frictional linings 13, 14 of clutch disks 15, 16 are arranged, which are each connected fixedly for rotation with the gear unit input shafts 6, 7, for example, by means of toothings. The pressure plates 11, 12 are in the illustrated embodiment acted upon by transfer elements 17, 18 which are displaced radially inwardly by actuating devices 19, 20 of the actuating system 21 directly and without lever effect of the transfer elements 17, 18, so that the force applied by the actuating devices 19, 20 to the pressure plates 11, 12 is essentially exerted by the transfer elements 17, 18. The pressure plate 11 of the frictional clutch 2 is pulled closed by means of the tie rod 22, while the frictional clutch 3 is pressed closed by means of the transfer element 17. The transfer elements 17, 18 are centered at the clutch housing 25. For this purpose, in the illustrated embodiment, the rivets 64 for receiving the support bearing 27 are widened into centering bolts 65 which extend through and center the transfer elements. In other embodiments, the transfer elements may also be centered at the pressure plates or at the tie rods 22.

The contact pressure plate 8 is fixedly connected to the clutch housing 25 formed by the two housing parts 23, 24, for example, by means of the rivets 26. At the clutch housing 25, the actuator housing 28 of the actuating system 21 is rotatably and axially fixedly received by means of the support bearing 27. The actuating system 21 has slave cylinders 47, 48 as actuating devices 19, 20, so that the actuator housing 28 is constructed as a slave cylinder housing. The slave cylinders 47, 48, which are acted upon by a pressure medium from the outside through pressure connections, have annular pistons 51, 52 which are axially displaceable in pressure chambers 49, 50, and which, with the intermediate arrangement of the actuating bearings 53, 54 which in the illustrated embodiment are constructed as needle bearings with low axial structural space act on the transfer elements 17, 18. The outer rings 55, 56 of the actuating bearings 53, 54 surround the annular pistons 51, 52 axially at the inner circumference thereof and seal on radial shaft sealing rings 57, 58 arranged on the annular pistons 51, 52 for forming an annular space 59 which forms towards the outside a tightly sealed chamber for lubrication and cooling of the actuating bearings 53, 54 and of the support bearing 27 by means of diaphragms 60, 61, such as bellows, rolling diaphragms or pendulum diaphragms with inclusion of the support bearing 27. The fluid introduced for this purpose into the annular space 59 can be circulated in a cooling cycle leading toward the outside via the actuator housing. In order to prevent wear at the seals 62, 63 such as grooved ring seals, as a result of bearing friction of the annular pistons 51, 52 rotated by the actuating bearings 53, 54, the annular pistons 51, 52 may have a lock against rotation with respect to the actuator housing. For example, the annular pistons 51, 52 may have between the radially inner and the radially outer sealing surfaces of the seals 62, 63 one or more axially projecting sections, such as pins, which engage in counter sections, such as blind-end bores, wherein the counter sections are correspondingly introduced from the base of the pressure chambers 49, 50. The slave cylinders 47, 48 are arranged with respect to their effects in opposite directions to each other, so that they can act on the pressure plates 11, 12 which are moved in opposing directions with respect to one another in an advantageous manner and with reversal of forces. For directly introducing the actuating forces, the transfer elements 17, 18 are formed stiff, for example as piston plates.

The actuator housing 28 is connected to the clutch housing 25 without play in order to be able to catch the actuating forces occurring in both directions, in particular during an intersecting connection of the two frictional clutches 2, 3 with a zero passage. The support bearing 27 is for this purpose equipped in the illustrated embodiment as a two-row inclined spherical bearing and is clamped by means of a circlip 66, such as a wedge circlip, against the stop 67 at the actuator housing 28. The actuator housing 28 is provided with an axial projection 29 which is centered at the receiving surface 30a of a central opening 30 of the gear unit housing 31. For compensating for a non-coaxial arrangement of the axis of rotation 4 of the gear unit 5, and the rotational axis, not shown, of the drive shaft 32 of the drive unit, not shown, the axial projection 29 is provided with a ballus 33 which has a radius the center point of which is located on the axis of rotation 4, so that the actuator housing 28 and with it the entire dual clutch is pivotable about a small angle from the axis of rotation 4. This pivot angle is facilitated on the drive side by a turning flank play of the plug-type connection 34 to be described in the following.

The dual clutch 1 is received by means of the plug-type connection 34 fixed against rotation and axially movable to a limited extent on the drive side. This drive side is in the illustrated embodiment formed by the drive shaft 32, which may be a crank shaft of an internal combustion engine, wherein a torsional vibration damper 35, such as a two-mass flywheel, is received by means of an input part 36. The output part 37 forms together with a flange part 38 for forming the plug-type connection 34 an internal toothing 39 which is in the circumferential direction meshing with play with an external toothing 40 arranged on the inner circumference of the housing part 23. Due to the axially expanded external toothing 40, a limited axial displacement of the dual clutch is possible, which is limited by the stop 41 provided on the gear housing 31, for example, in the form of a circlip or safety ring, for the axial projection 29 of the actuator housing 28. Consequently, the dual clutch is supported so as to be axially floating. The rotary play of the plug-type connection 34 is pre-tensioned against the effects of energy storage 42 which may be pre-tensioned against a tensioning plate 43. Connected to the flange part 38 is a bearing plate 44 which, together with a bearing plate 45 arranged at the drive shaft 32 forms a bearing 46, for example a friction bearing for the output part 37 and, thus, via the dual clutch 1 received at the output part 37 by means of the plug-type connection 34. Aside from the clutch disks 15, 16, the dual clutch is now uncoupled from the gear unit input shafts 6, 7.

The dual clutch 1 is supplied as a complete structural unit which comprises the actuating system. The connection of the two slave cylinders takes place by means of quick couplings, not shown. Because of the plug-type connection 34, an assembly can be carried out without tools. For this purpose, the dual clutch 1 is pushed onto the gear unit input shafts 6, 7, the pressure connections are subsequently connected to the pressure lines of the pressure generator. With the connection of the drive unit and gear unit 5, the plug-type connection 34 is formed.

Figure 2:
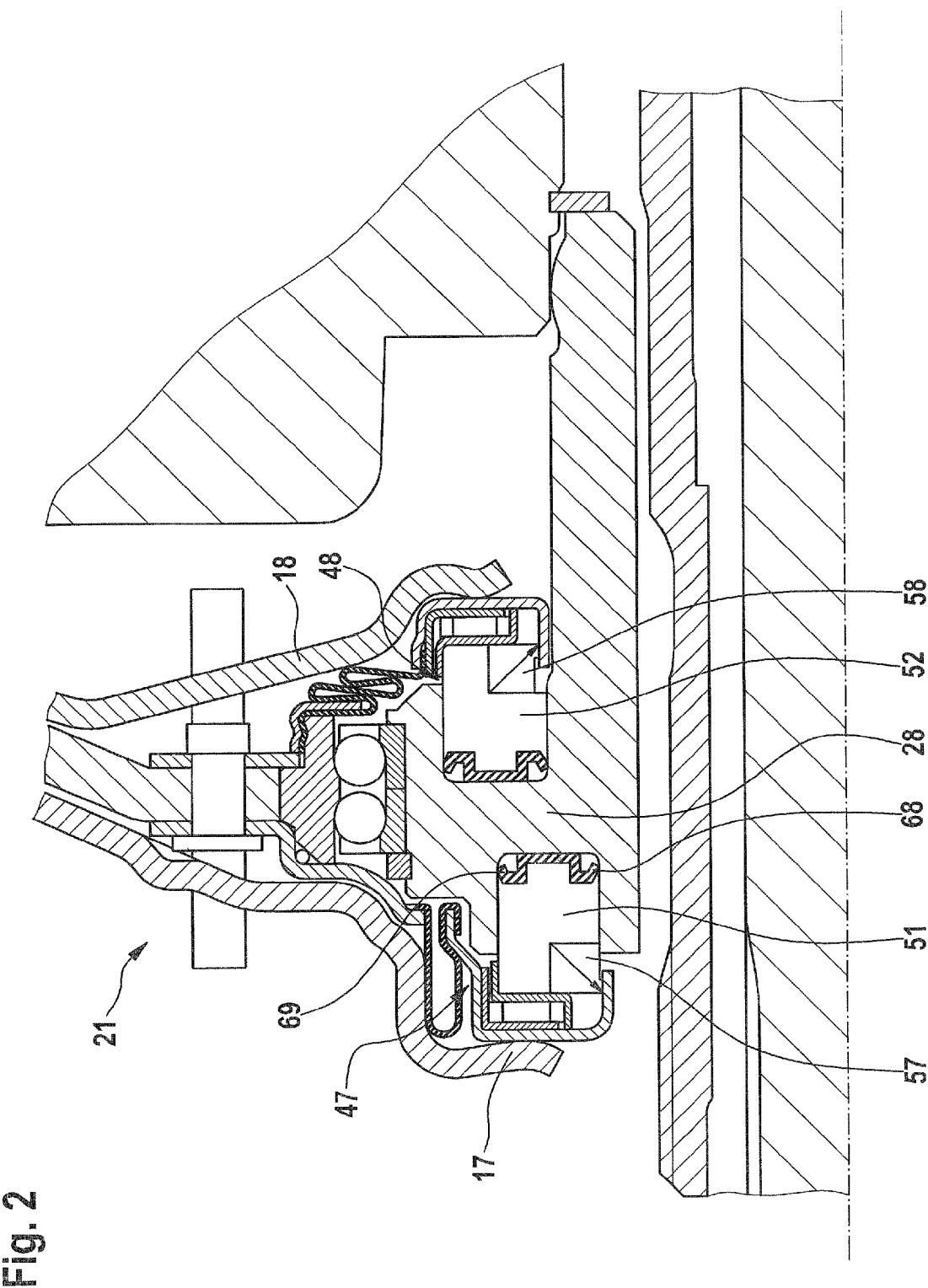
FIG. 2 shows the actuating system of FIG. 1 in detail.

FIG. 2 shows the actuating device 21 of FIG. 1 in detail. The annular pistons 51, 52 each displace the transfer elements radially outwardly, because the radial shaft sealing rings 57, 58 are arranged on the inner circumference. A possible one-sided load of the annular pistons 51, 52 caused as a result and by other effects, may lead to a slightly inclined position of the annular pistons relative to the actuator housing 28. For ensuring the tightness of the slave cylinders 47, 48, the sealing lips 68, 69 may be constructed in such a way that they compensate for a corresponding play of the annular pistons 51, 52.

Figure 3:
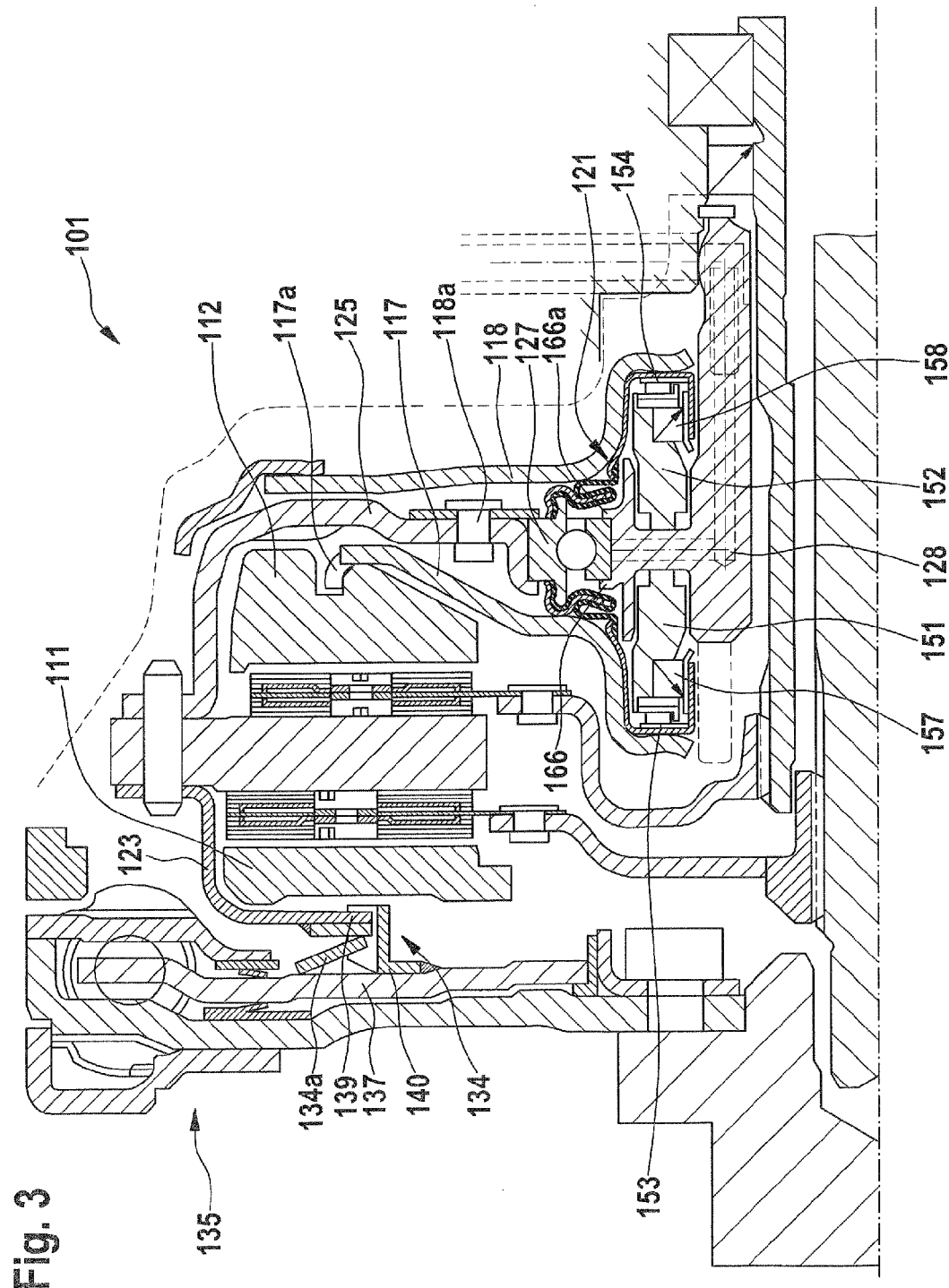
FIG. 3 shows a further dual clutch which is similar to the dual clutch illustrated in FIG. 1.

FIG. 3 shows the dual clutch 101 which is similar to the dual clutch 1 of FIG. 1. In addition to a changed configuration of the plug-type connection 134 axially pre-tensioned by means of the energy storage 134a on the radial level of the pressure plate 111, wherein the external toothing 140 is arranged on the output part 137 of the torsional vibration damper 135 and the inner toothing 139 at the housing part 123, the transfer element 117 is centered by means of a centering nose 117a at the pressure plate 112. Centering of the transfer element 118 takes place by means of plate spring 118a at the clutch housing 125. The annular pistons 151, 152 of the actuating system 121 are arranged on the same diameter, so that identical parts can be used for the annular pistons 151, 152 and the seals thereof, the actuating bearings 153, 154 and radial shaft sealing rings 157, 158. Moreover, the support bearing 127 is received on the actuator housing 128 at the stop 166 and is fixed by means of a material deformation 166a.

Figure 4:
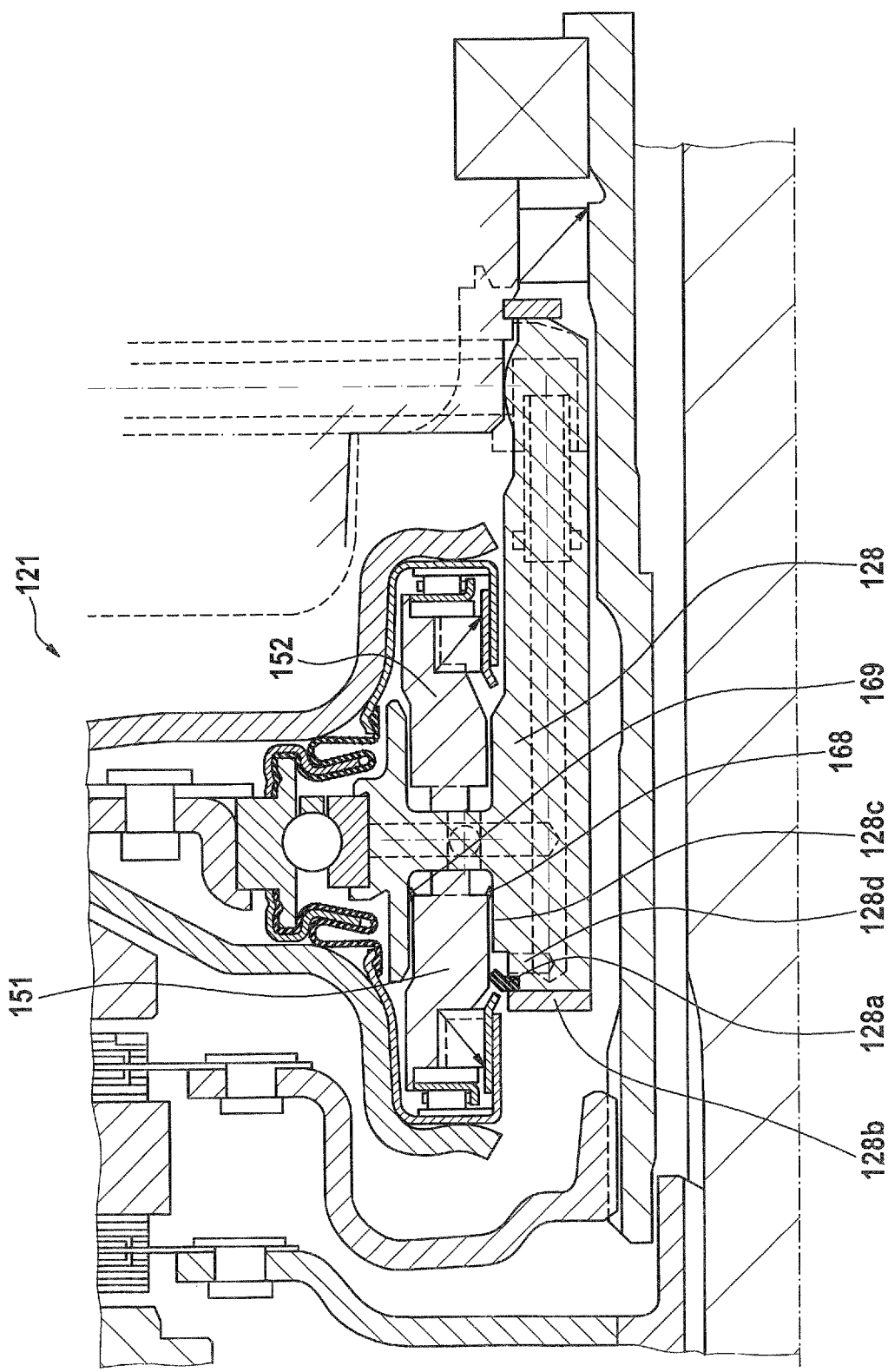
FIG. 4 shows the actuating system of FIG. 3 in detail.

FIG. 4 shows essentially the actuating system 121 in detail. The annular pistons 151, 152 are provided with vulcanized or extruded sealing lips 168, 169. Appropriate measures can be taken in the case of leakage of the sealing lips 168, 169 which may damage the dual clutch, and which particularly may lead to a friction value reducing contamination of the friction linings and frictional surfaces of the clutch disks and the contact pressure plates and the pressure plates. As shown in connection with the embodiment deviating from FIG. 3 in the example of the annular piston 151, axially spaced from the sealing lip 168 a wiper ring 128a may be provided on the actuator housing 128 and fixed by means of a stop disk 128b, which wipes off any emerging pressure medium from the annular piston 151. For conducting away emerging pressure medium, an opening 128d may be provided outside of the sealing surface 128c of the sealing lip 168 which conducts the pressure medium in the actuator housing to the outside into a gear sump or some other vessel. It is understood that corresponding rings may also be provided at the remaining piston surfaces of the annular pistons 151, 152.

Figure 5:
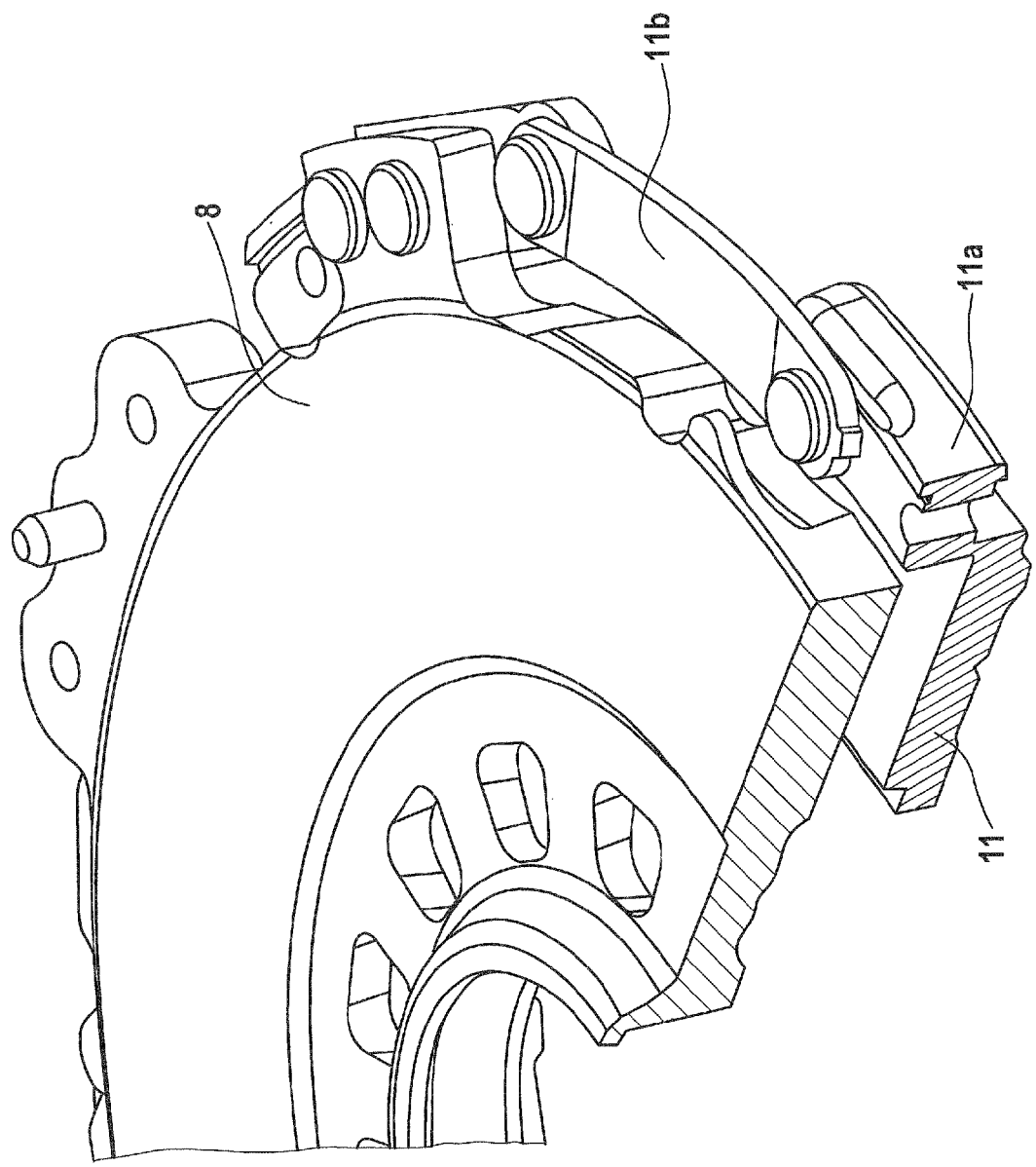
FIGS. 5 and 6 show the connection of the pressure plates to the contact pressure plate.
Figure 6:
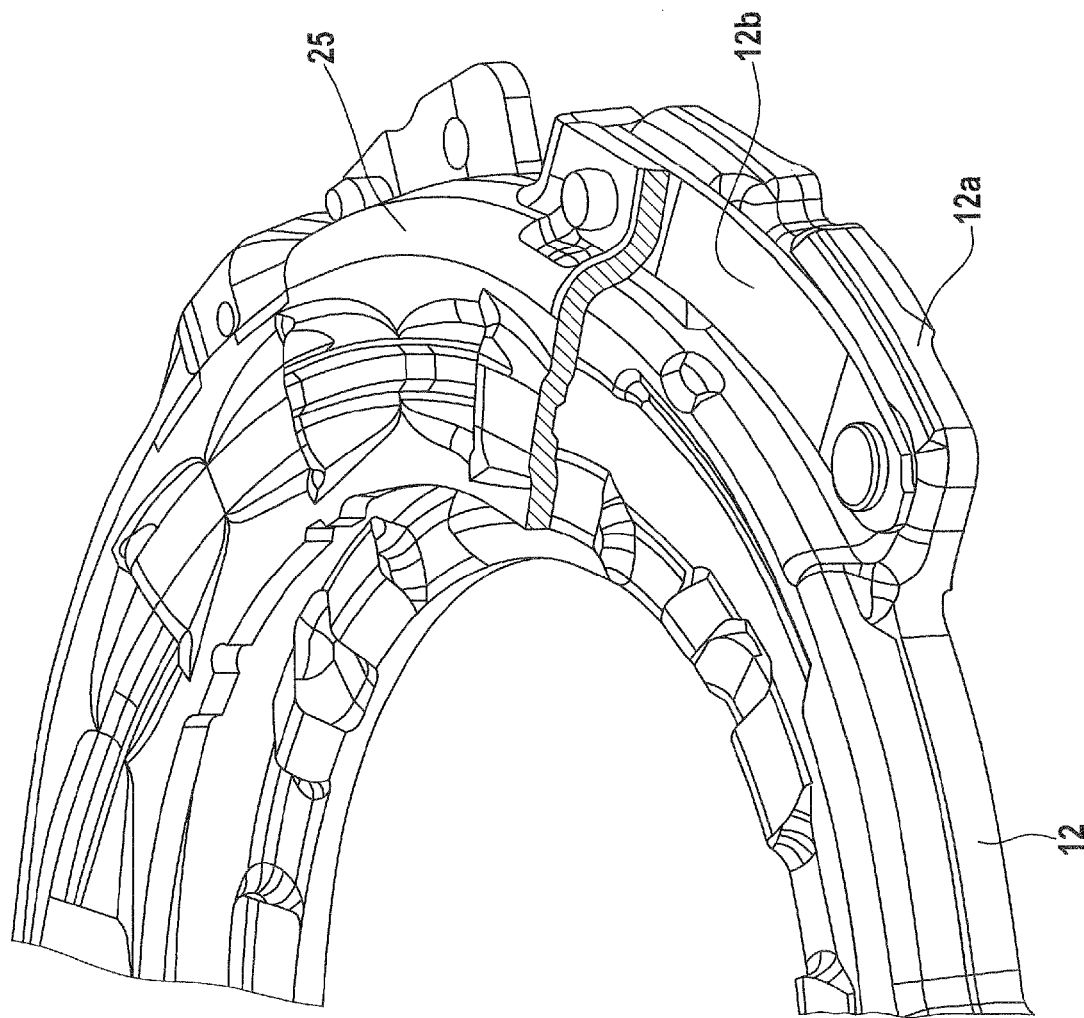

FIGS. 5 and 6 show portions of the manner of fastening of the pressure plates 11, 12 to the contact pressure plate 8, or to the clutch housing 25. The pressure plates 11, 12 have for this purpose radially extended portions 11a, 12a to the ends of which are connected plate springs 11b, 12b. At their other ends, the plate springs 11b, 12b are connected to the contact pressure plate 8 or to the clutch housing 25. Consequently, the plate springs 11b are pre-tensioned in such a way that the contact pressure plate 8 and the pressure plate 11 in the un-loaded state of the pressure plate 11 are spaced apart by a maximum distance for adjusting an air gap relative to the frictional linings. On the other hand, the plate springs 12b are pre-tensioned in such a way that the pressure plate 12 approaches by a maximum the clutch housing 25 in order to also ensure an air gap relative to the frictional linings. The corresponding frictional clutches are therefore constructed as forcibly pressed closed frictional clutches (normally open), so that in the case of unloaded actuating devices, the frictional clutches open automatically. For this purpose, the plate springs 11b, 12b are constructed with appropriate reinforcements, so that any frictional losses occurring between the pressure plates 11, 12 and the actuating devices as well as in the actuating devices are compensated. For example, the sealing friction of the slave cylinders 47, 48 of FIG. 1. must be overcome. Additional energy storage units for supporting the plate springs 11b, 12b, may be provided.

Figure 7:
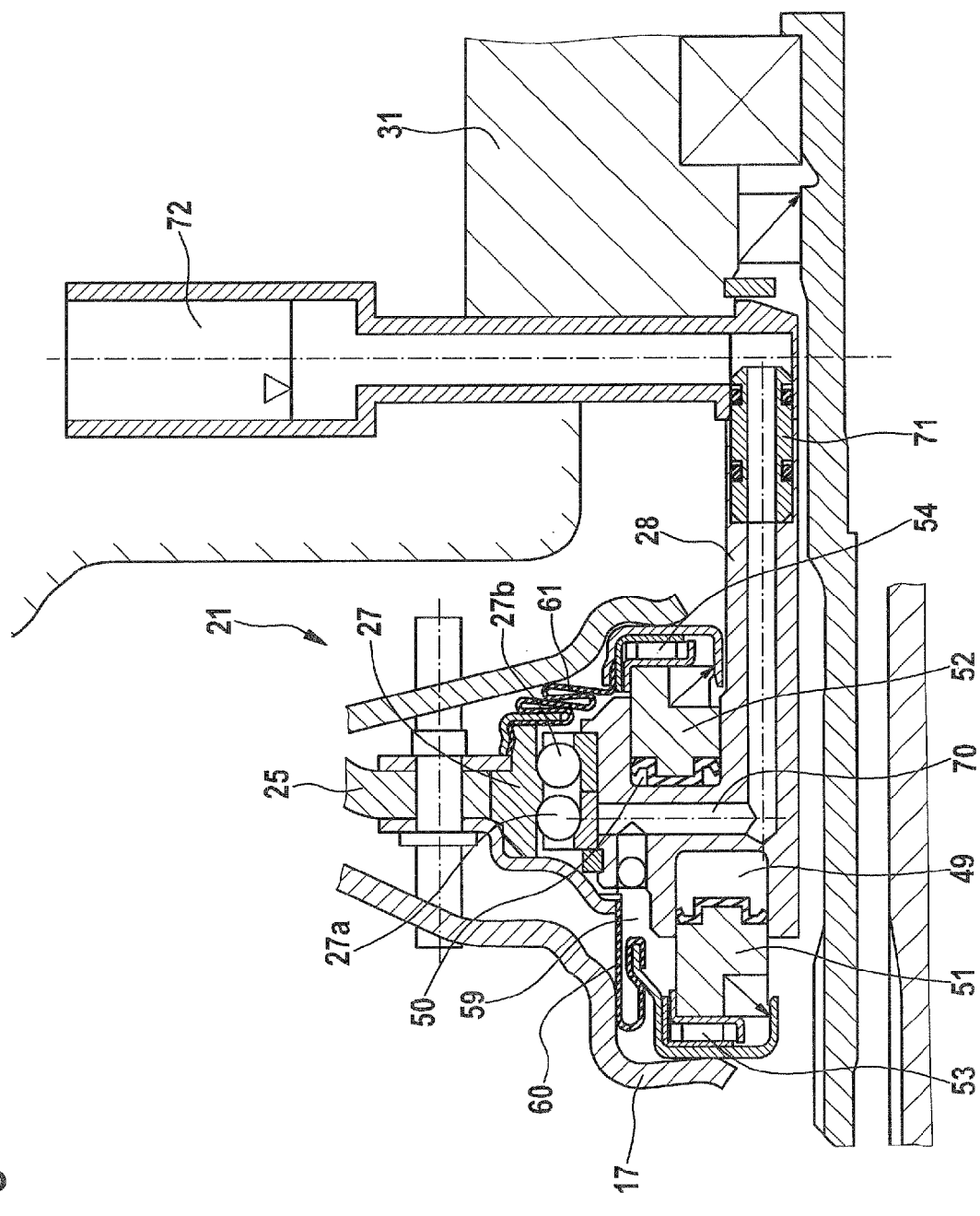
FIG. 7 shows an embodiment for supplying the annular space with fluid.

FIG. 7 shows the actuating system 21 of FIG. 1 in a modified sectional view. In this view, pressure is applied to the pressure chamber 49 and displaces the annular piston 51 axially, which annular piston 51 acts on the transfer element 17 via the actuating bearing 53. If no load is applied to the pressure chamber 50, the annular piston 52 does not apply pressure on the actuating bearing 54. Due to the one-sided exertion of pressure on the transfer element 17, the actuator housing 28 is supported by the support bearing 27 at the clutch housing 25, so that the rolling bodies 27a are axially loaded. When the annular piston 52 is actuated, the actuator housing 28 is supported in the opposite direction, so that the rolling bodies 27b of the second row are axially loaded. When both frictional clutches 2, 3 are actuated (FIG. 1), the axial loading forces of the support bearing partially offset each other.

The annular space 59 which receives the actuating bearings 53, 54 and the support bearing 27 is filled in the illustrated embodiment completely with fluid, such as lubricant and cooling medium. In order to achieve volume compensation when the volume changes due to a displacement of the annular pistons 51, 52, and, thus, to reduce the pressure applied to the diaphragms 60, 61, a supply line 70 to the annular space 59 is provided in the actuator housing, wherein the supply line 70 is connected by means of a pipe section 71 to a container 72 which is constructed as a supply and level container. The container 72 can be connected for rotation with the gear housing 31. When one or both frictional clutches are actuated, the volume of the annular space 59 is expanded and fluid can flow from the container 72 through the supply line 70 into the annular space 50 as a result of gravity. When one or both frictional clutches are opened, the annular pistons 51, 52 are displaced in the direction toward the pressure chambers 49, 50 so that the volume of the annular chamber 59 is reduced and the fluid is displaced from the annular chamber into the container.

Figure 8:
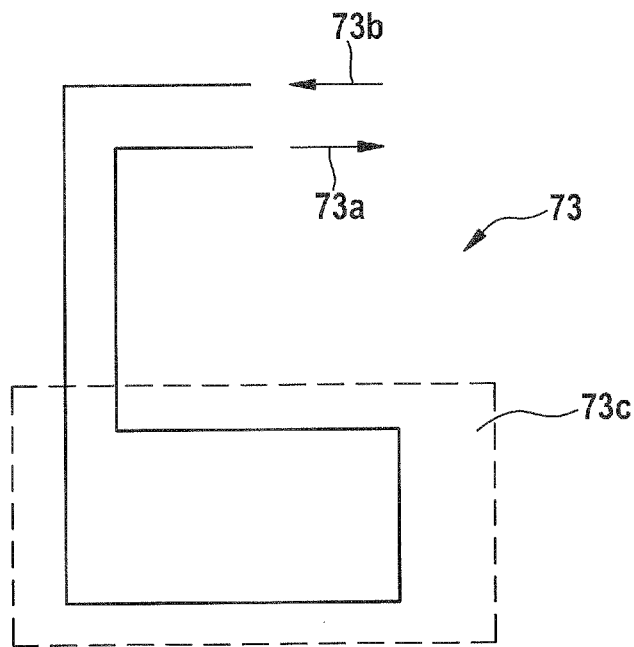
FIG. 8 shows a schematically illustrated lubricant cycle.

FIG. 8 shows schematically a cooling cycle 73 with a discharge 73a and an inflow 73b from and to the annular space, not shown. The circulation of the fluid takes place via a cooling zone 73c which may be, for example, the gear unit housing or a separate radiator.

Figure 9:
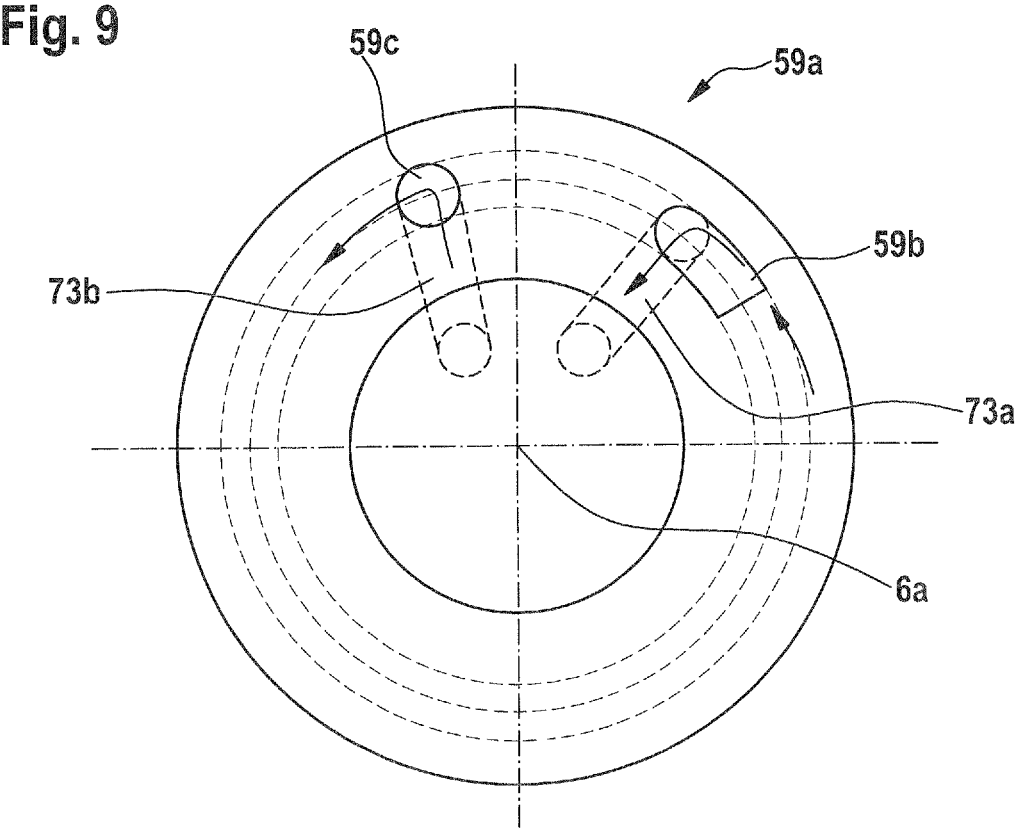
FIG. 9 shows a detail of a lubricant cycle.

FIG. 9 shows in a sectional view an annular space 59a formed around the axis of rotation 6a. In the annular space 59a is radially outwardly provided a scoop pipe 59b which is connected to the discharge 73a. By way of the rotation of the walls of the annular space 59a, for example the diaphragms 60, 61 and the outer rings of the actuating bearings 53, 54 and of the support bearing 27 (FIG. 7), the fluid is accelerated in the annular space with the dual clutch in rotation, and the fluid can be skimmed off by the scoop pipe 59b mounted, for example, on the stationary actuator housing and can be circulated in a cooling cycle 73 corresponding to FIG. 8 and can be supplied via the supply line 73b and the opening 59c into the annular space 59a in the cooled state.

Figure 10:
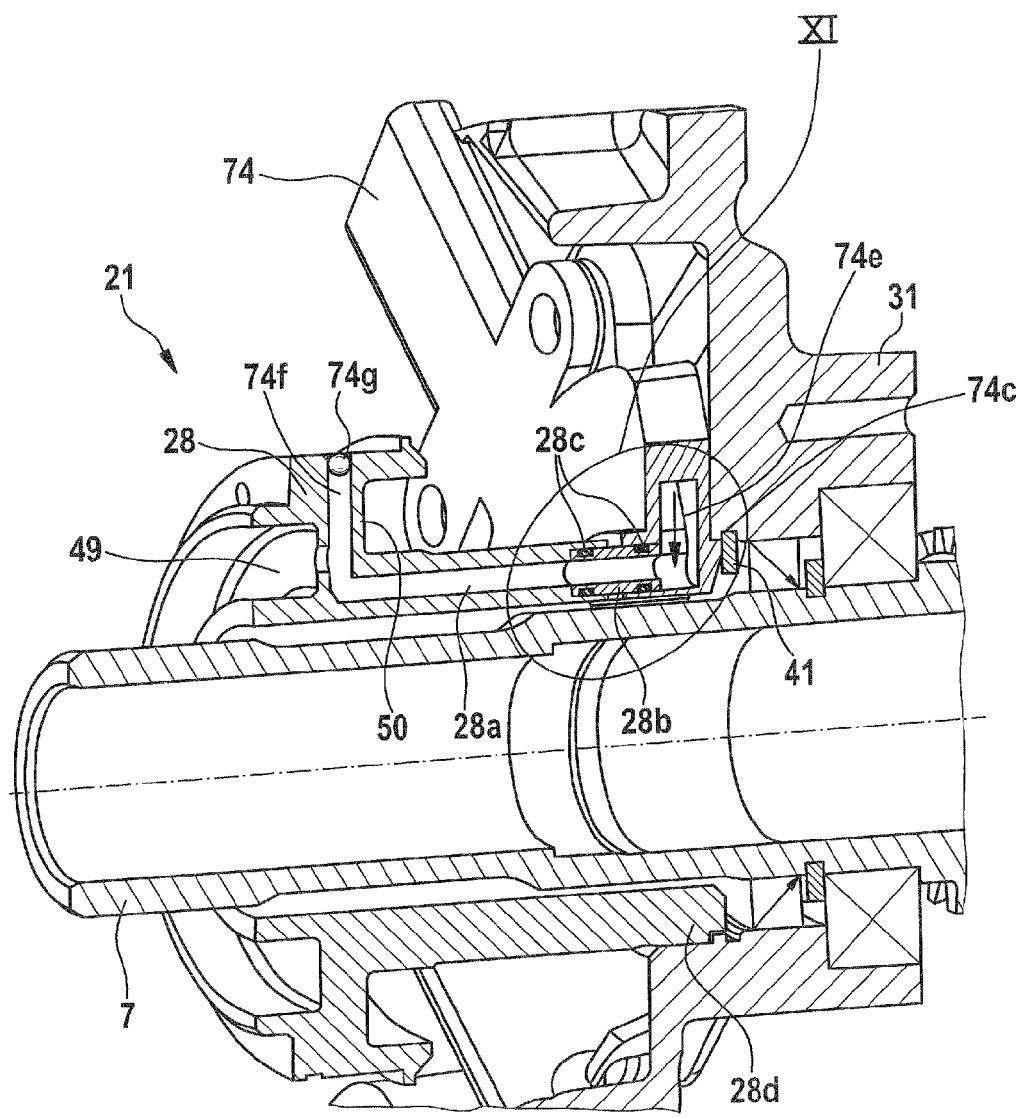
FIG. 10 shows an embodiment for supplying the actuating system in a sectional view.
Figure 11:
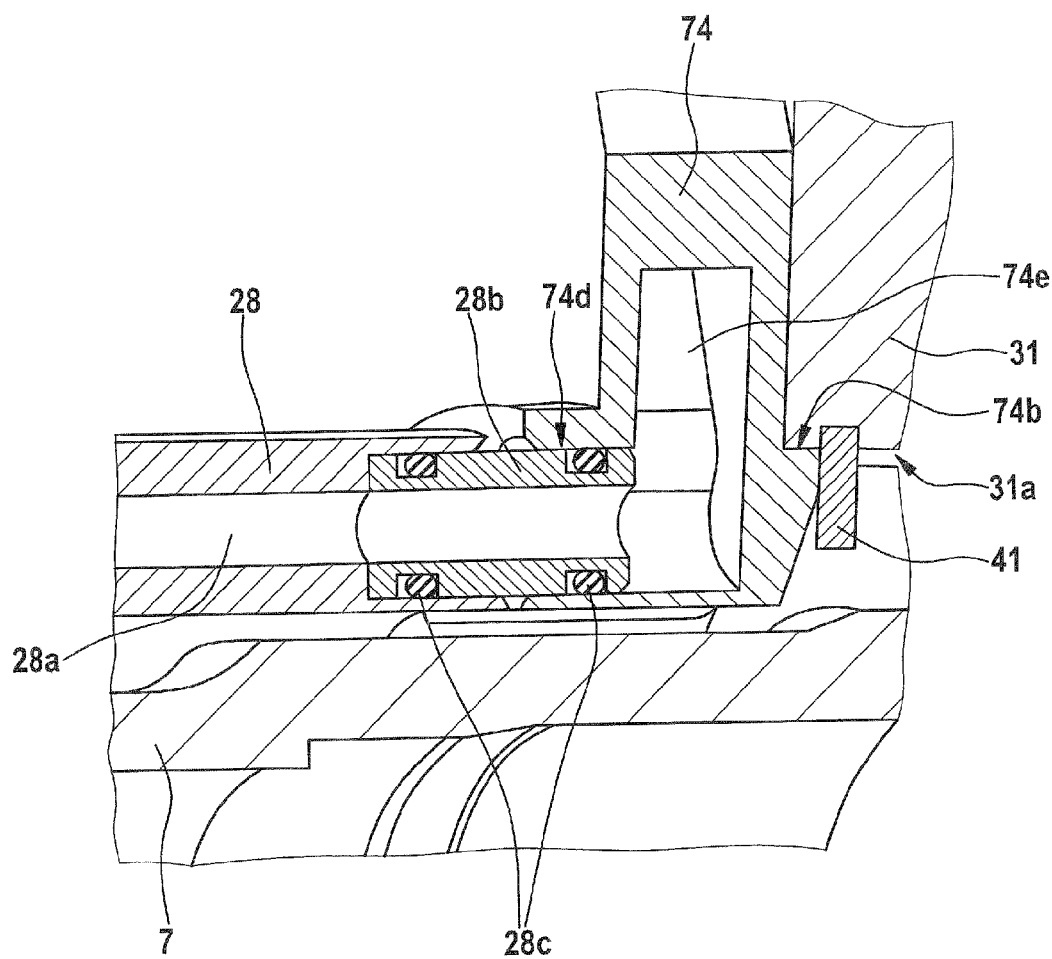
FIG. 11 shows a detail of FIG. 10.
Figure 12:
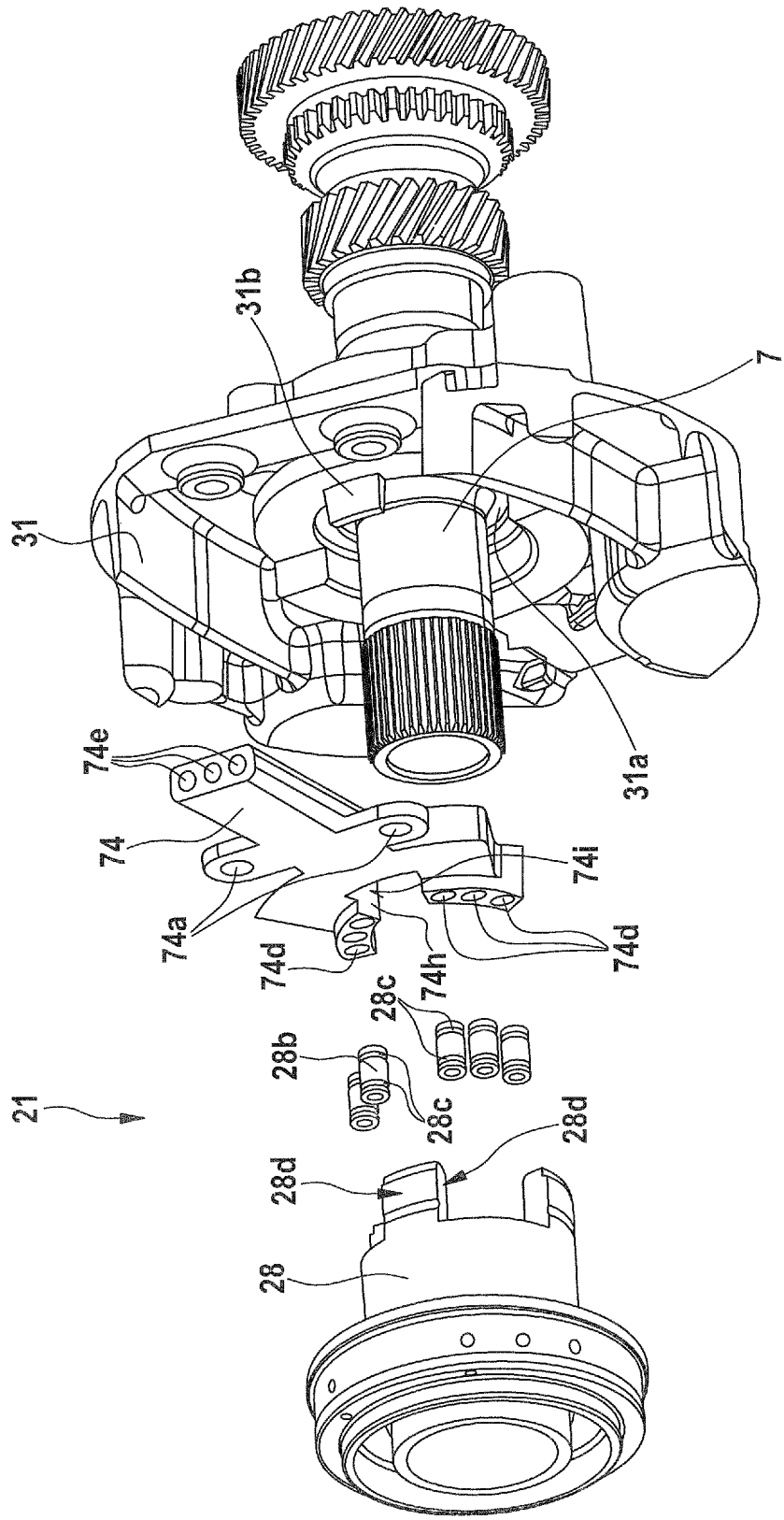
FIG. 12 shows the embodiment of FIG. 10 in an exploded view.

FIGS. 10 through 12 show the supply of the actuating system 21 of the dual clutch 1 illustrated in FIG. 1 in a sectional view (FIG. 10), in detail (FIG. 11) and as an exploded view (FIG. 12). Of the actuating system 21, only the actuator housing 28 is illustrated with the omission of the annular pistons. The supply of pressure medium for each slave cylinder and possibly for a cooling cycle of the annular space takes place by means of a supply part 74 which is mounted fixedly to the gear unit housing 31, for example, by means of screws which are screwed through the openings 74a. Here, the supply part 74 is centered on the central opening by way of a centering collar 74b. The supply part 74 has openings 74d which are distributed about the circumference of the gear unit input shaft and which openings are assigned to corresponding supply lines 74e which are supplied with pressure medium for the pressure chambers 49, 50 and fluid for the annular space by way of the outer pressure medium of fluid supply devices like master cylinder, pumps or storage tanks and supply and/or discharge lines. In this embodiment, the actuator housing 28 with the openings 74d has corresponding lines 28a which are drilled into the actuator housing. FIG. 10 shows in a sectional view a supply line for the pressure chamber 49. For reasons of clarity, a tap bore 74f is placed from radially outside, which is closed by a ball 74g or the like. The other lines in the actuator housing 28 distributed over the circumference are also produced in a similar fashion.

The lines 28a are connected to the supply lines 74e of the supply part 74 by means of pipe sections 28b, wherein the latter are sealed relative to the lines 28a and the supply lines 74e by means of a sealing ring 28c. The pipe sections 28b can support the torque acting on the actuator housing 28 with respect to the gear unit housing 31 as a result of bearing friction and drag losses. Furthermore, the pipe sections 28b may be provided with play relative to the receiving means thereof, so that an angular offset caused by tolerances of the axes of rotation between dual clutch and gear unit housing 31 can be compensated.

The actuator housing 28, in circumferential areas in which no connection of the supply lines 74e with the lines 28a takes place, is provided with axial projections 28d. By means of these projections 28d, which engage in the central opening 31a of the gear unit housing 31, or by means of the supply component at the centering nose 74b thereof, the support of the dual clutch 1 (FIG. 1) takes place at the gear housing 31. The dual clutch 1 (FIG. 1) is connected to the stop 41 and is clamped, for example, by means of the energy storage unit 134a of FIG. 3, against the latter. Recesses 74h corresponding to the projections 28c are on the supply part 74, and have stop surfaces 74i, 28e arranged in circumferential direction and adjacent to one another, which stop surfaces, alternatively or additionally to the pipe sections 28b, may form a torque support for the actuator housing. The supply part 74 may be pre-centered on the gear unit housing 31 by way of the nose 31b engaging with the recess 74h or may be supported in the circumferential direction.

Figure 13:
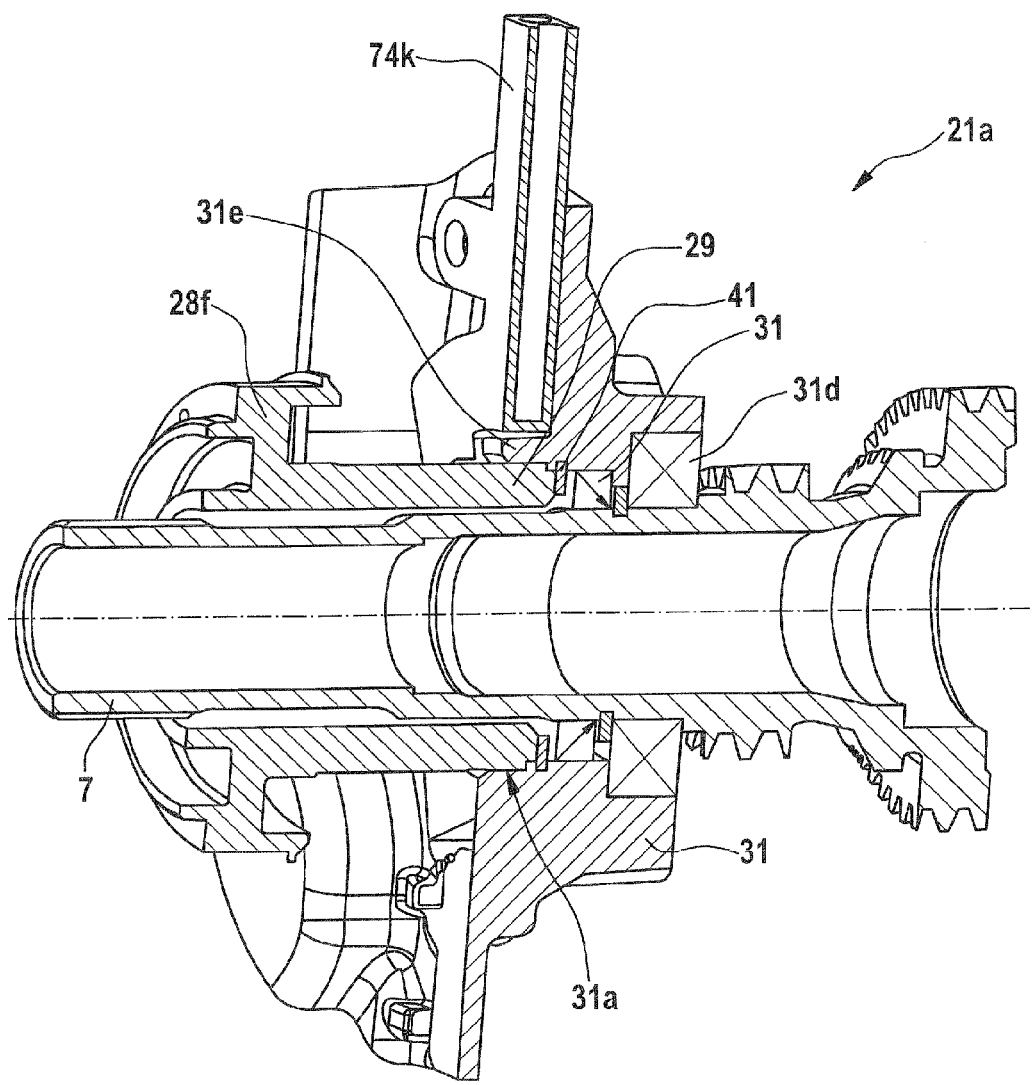
FIG. 13 shows an embodiment of the actuator housing in a sectional view.

FIG. 13 shows an alternative embodiment of an actuating system 21 of FIGS. 10 to 12 in form of an actuating system 21a in which the actuator housing 28f is completely radially supported by means of the axial projection 29 at the central opening 31a of the gear unit 31 and is clamped against the stop 41. Axially spaced from the stop 41 the gear unit input shaft 7 is sealed relative to the central opening 21a and further axially spaced apart is supported by means of the bearing 31d. The supply part 74k is received on the gear unit step 31e. The connections between the actuator housing 28f and the supply part 74k, which are not illustrated, may be arranged radially.

Figure 14:
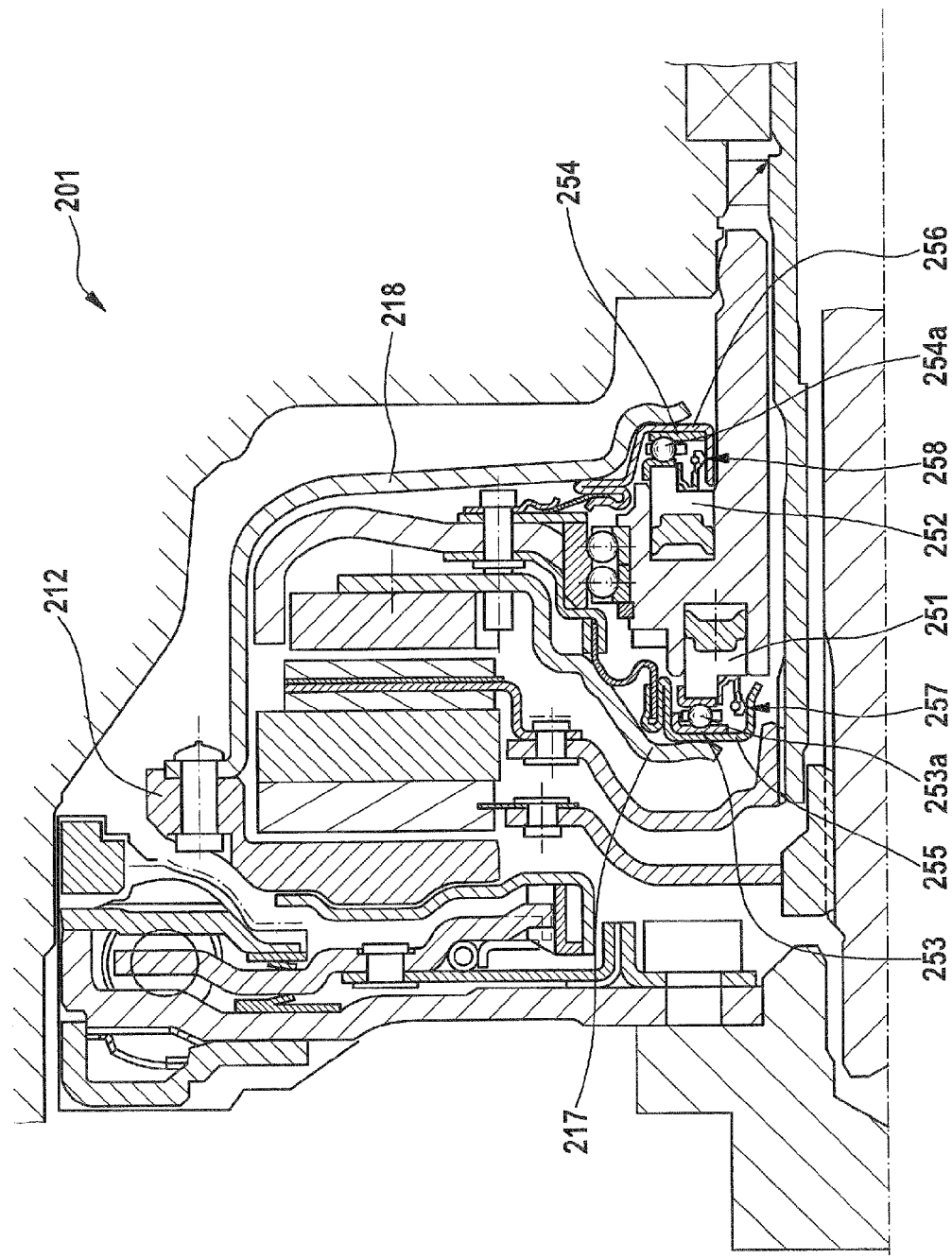
FIG. 14 shows a further dual clutch similar to the dual clutch shown in FIG. 1.

FIG. 14 shows an embodiment of a dual clutch 201 with actuating bearings 253, 254, which are formed of ball bearings. Due to the radial load bearing capacity of the balls 253a, 254a of the actuating bearing 253, 254, the outer rings 255, 256 as well as the annular pistons 251, 252 are radially stabilized relative to the transfer elements 217, 218, so that the radial impact of the radial shaft sealing rings 257, 258 can be minimized.

Moreover, the transfer element 218 is constructed as a single piece without tie rod and the annular piston 252 transmits the actuating forces directly onto the pressure plate 212.

Figure 15:
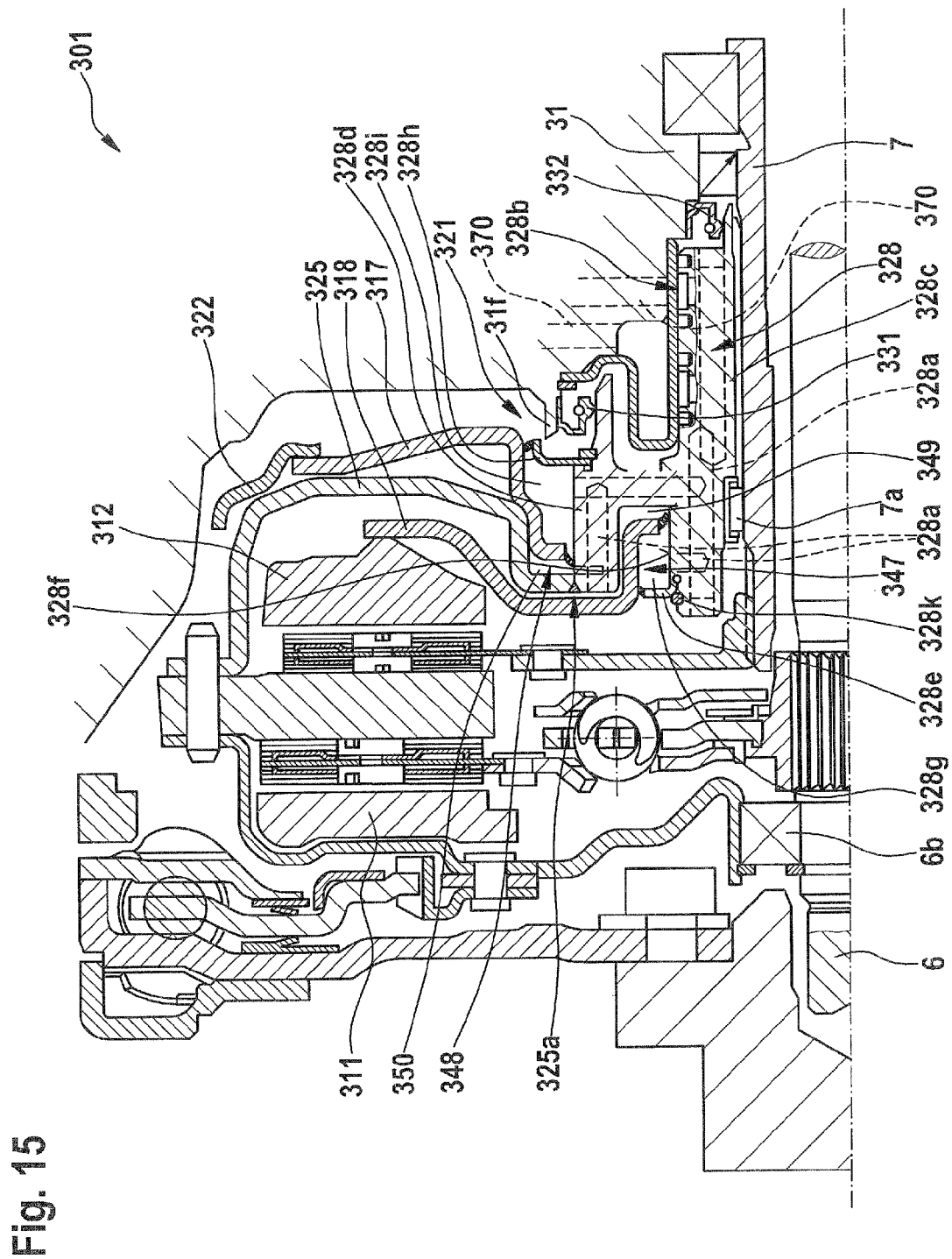
FIG. 15 shows a partial sectional view of an embodiment of a dual clutch with an actuator housing connected non-rotatably to the clutch housing.

FIG. 15 shows an embodiment 58 of a dual clutch 301 which has an actuating system 321 connected fixedly to the gear unit housing. For this purpose, the actuator housing 328 is non-rotationally received by way of a welding 325a at the clutch housing 325. The supply of the pressure chambers 349, 350 of the slave cylinders 347, 348 takes place by means of lines 328a, illustrated in broken lines, provided in the actuator housing 358, which communicate via rotary connections 328b with supply lines 370 of the gear unit housing 31 fixedly connected to the housing. For sealing the rotary connections 328b, sealing means are provided between the gear unit housing 31 and the actuator housing 328 in the form of radial shaft seals 331, 332. The annular pistons of the slave cylinder 347, 348 are constructed as single parts from the transfer elements 317, 318. Actuating bearings can be omitted because of the identical rotation of actuator housing 328 and clutch housing 325 as well as the transfer elements 317, 318. The transfer elements 317, 318 seal relative to the pressure chambers 349, 350 preferably by means of sealing lips which are integrally formed by injection molding or vulcanization.

For reasons of manufacturing technology, the actuator housing 328 is divided into two parts for production of the lines 328a. It is composed of the lower part 328c, in which the rotary connections 328b are mounted, for example, by turning, and an upper part 328d, wherein the two parts are sealed relative to each other. For this purpose, the upper part 328d is pushed into the lower part 328c and is sealed by means of the centrifugal oil chamber plate 328e which is axially fixed at the upper part 328d by means of the safety ring 328k. The centrifugal oil chamber plate 328e forms a sealing surface 328f at the inner circumference of the pressure chamber 349. Furthermore, the centrifugal oil chamber sealing plate 328e forms a centrifugal oil chamber 328g which is filled with pressure medium and compensates the centrifugal force influence of the pressure medium present in the pressure chamber 349 and increasing the disengaging force. In the same manner, the slave cylinder 348 has a centrifugal oil chamber sealing plate 328h which forms a centrifugal oil chamber 328i filled with pressure medium which compensates a corresponding contact pressure at the pressure plate 311 by means of centrifugal force of the pressure medium of the pressure chamber 350. In this connection, the contact force transmitted onto the transfer element 317 acts on the pressure plate 311 is displaced by means of the tie rods 322, while the pressure plate 312 is displaced by the transfer element 318 directly.

In the illustrated embodiment, the dual clutch 301 is supported by means of a fixed bearing 6b on the gear unit input shaft 6 and by means of a loose bearing 7a, such as needle bearing, supported on the gear unit input shaft 7. It is understood that the dual clutch may be mounted in the gear unit housing in the same manner as illustrated in FIGS. 1 and 3. For this purpose, the dual clutches can be connected to the drive side by means of a corresponding plug-type connection so as to be non=rotatable and axially displaceable to a limited extent, and can be received at the gear housing 31, for example, at the projection 31f in an axially fixed manner by means of a fixed bearing. In this case, fixed bearing 6a can be omitted and the loose bearing 7a can be used, for example, for pre-centering during the assembly and can have after the assembly an air gap relative to the actuator housing 328.

Figure 16:
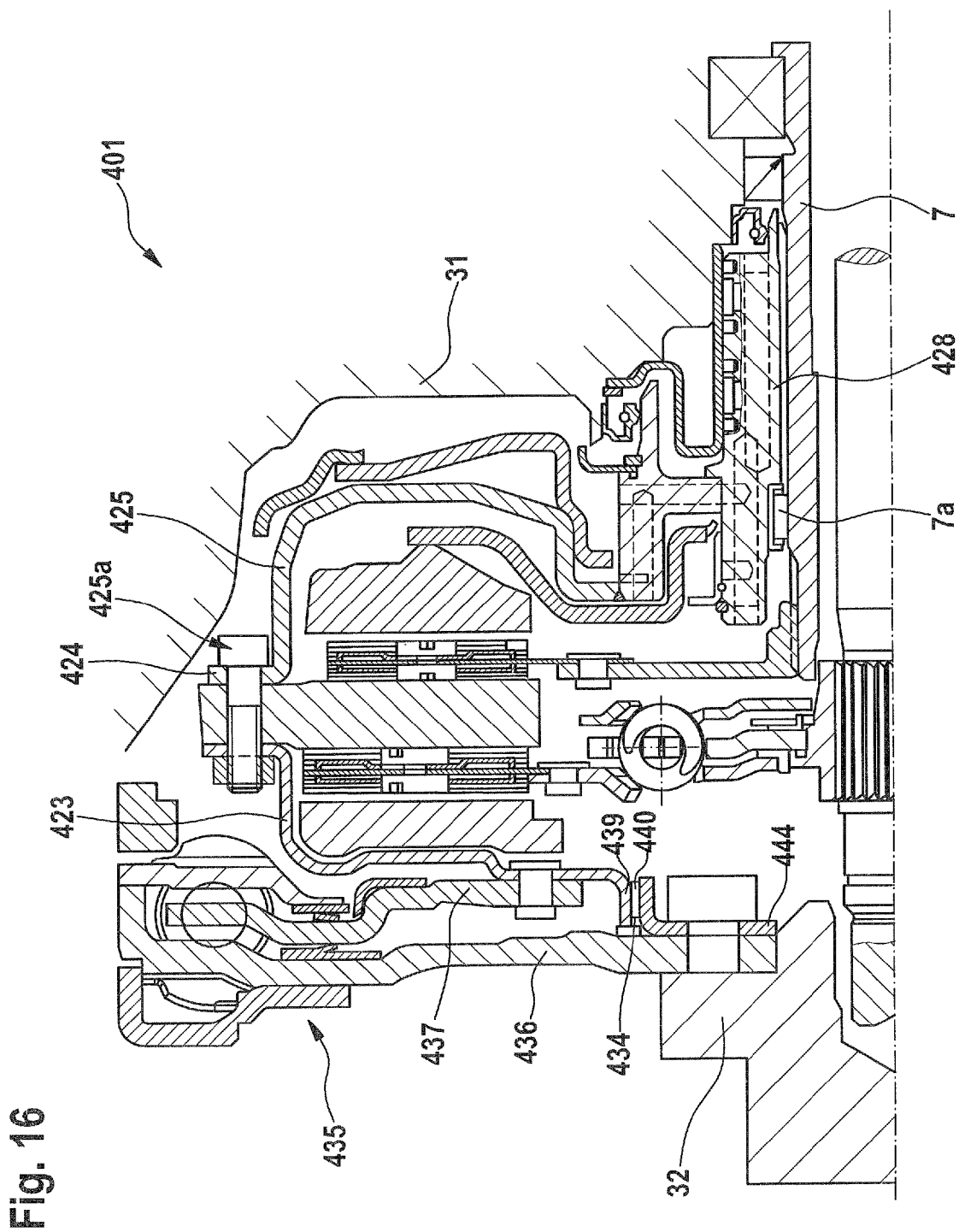
FIG. 16 shows a further dual clutch similar to the dual clutch shown in FIG. 15.

FIG. 16 shows a dual clutch 401 which is slightly changed relative to the frictional clutch of 301 of FIG. 15 in which the housing part 423 is fixedly received on the drive side at the output part 437 of the torsional vibration damper 435. The input part 436 is fixedly mounted on the drive shaft 32. On the screw connection of the drive shaft 32 is fixedly arranged the outer toothing 440 of the plug-type connection 434 formed by the bearing sheet 444. The inner toothing 439 of the plug-type connection 434 is formed by the radially inwardly expanded housing part 423.

The assembly of the dual clutch 401 takes place separately. The housing part 423 with the torsional vibration damper 435 is mounted on the drive side. The housing part 424 with the remaining structural components of the dual clutch 401, such as clutch housing 425, is mounted on the drive side and supported at the loose bearing 7a of the gear unit input shaft 7. When the drive unit and the gear unit are connected, the housing part 423 and the clutch housing 425 are screwed together by means of the screws 425a. This dual clutch 401 can also be mounted fixedly on the gear unit in an advantageous manner. The loose bearing 7a may be used as pre-centering during the assembly and may, after the assembly, have an air gap relative to the actuator housing 428, so that the dual clutch is supported on the gear unit side exclusively by means of the actuator housing 428 at the gear unit housing 31. A mounting can also take place corresponding to the dual clutch 301 in FIG. 15.

LIST OF REFERENCE NUMERALS 1 dual clutch
2 frictional clutch
3 frictional clutch
4 axis of rotation
5 gear unit
6 gear unit input shaft
6a rotational axis
6b fixed bearing
7 gear unit input shaft
7a loose bearing
8 contact pressure plate
9 frictional surface
10 frictional surface
11 pressure plate
11a extension
11b plate spring
12 pressure plate
12a extension
12b plate spring
13 frictional lining
14 frictional lining
15 clutch disk
16 clutch disk
17 transfer element
18 transfer element
19 actuating device
20 actuating device
21 actuating system
21a actuating system
22 tie rod
23 housing part
24 housing part 25 clutch housing
26 rivet
27 support bearing
27a rolling body
27b rolling body
28 actuator housing
28a line
28b pipe section
28c sealing ring
28d projection
28e stop surface
29 axial projection
30 opening
30a receiving surface
31 gear housing
31a central opening
31b nose
31c seal
31d bearing
31e gear unit step
31f projection
32 drive shaft
33 ballus
34 plug-type connection
35 torsional vibration damper
36 input part
37 output part
38 flange part
39 internal toothing
40 external toothing
41 stop
42 energy storage
43 tensioning plate
44 bearing plate
45 bearing plate
46 bearing
47 slave cylinder
48 slave cylinder
49 pressure chamber
50 pressure chamber
51 annular pistons
52 annular pistons
53 actuating bearing
54 actuating bearing
55 outer ring
56 outer ring
57 radial shaft sealing ring
58 radial shaft sealing ring
59 annular space
59a annular space
60 diaphragm
61 diaphragm
62 seal
63 seal
64 rivet
65 centering bolt
66 circlip
67 stop
68 sealing lip
69 sealing lip
70 supply line
71 pipe section
72 container
73 cooling cycle
73a discharge
73b discharge
73c cooling zone 74 supply part
74a opening
74b centering collar
74d openings
74e supply line
74f tap hole
74g ball
74h recess
74i stop surface
74k supply part
101 dual clutch
111 pressure plate
112 pressure plate
117 transfer element
117a centering nose
118 transfer element
118a plate spring
121 actuating system
125 clutch housing
123 housing part
127 support bearing
128 actuator housing
128a wiper ring
128b stop disk
128c sealing surface
128d opening
134 plug-type connection
134a energy storage
135 torsional vibration damper
137 output part
139 internal toothing
140 external toothing
151 annular piston
152 annular piston
153 actuating bearing
154 actuating bearing
157 radial shaft sealing ring
158 radial shaft sealing ring
166 stop
166a material deformation
168 sealing lip
169 sealing lip
201 dual clutch
212 pressure plate
217 transfer element
228 transfer element
251 annular piston
252 annular piston
253 actuating bearing
253a ball
254 actuating bearing
254a ball
255 outer ring
256 outer ring
257 radial shaft sealing ring
258 radial shaft sealing ring
301 dual clutch
311 pressure plate
312 pressure plate
317 transfer element
318 transfer element
321 actuating system
322 tie rod
325 gear unit housing
325a welding
328 actuator housing
328a line 328b rotary connection
328c lower part
328d upper part
328e centrifugal oil chamber plate
328f sealing surface
328g centrifugal oil chamber
328h centrifugal oil chamber plate part
328i centrifugal oil chamber
328k safety ring
331 radial shaft seal
332 radial shaft seal
347 slave cylinder
348 slave cylinder
349 pressure chamber
350 pressure chamber
370 supply line
401 dual clutch
423 housing part
424 housing part
425 clutch housing
425a screw
428 actuator housing
434 plug-type connection
435 torsional vibration damper
436 input part
437 output part
439 internal toothing
440 external toothing
444 bearing plate

The invention claimed is:

1. A dual clutch, comprising: two frictional clutches driven by a drive unit, with a common clutch housing and a contact pressure plate with two frictional surfaces fixedly connected to the clutch housing, and two axially displaceable pressure plates each facing one of the frictional surfaces,
   wherein between each of the pressure plates and the contact pressure plate, frictional linings of a respective clutch disk are non-rotatably connected to a respective gear unit input shaft of a gear unit,
   an actuating system having actuating devices corresponding to each respective clutch disk for forming a frictional engagement between the each of the pressure plates and the frictional linings of the respective clutch disk by axially acting on the pressure plates,
   wherein the actuating system is axially fixedly received by means of a common actuator housing relative to the clutch housing, the actuator housing includes both actuating devices and the actuating devices are axially effective in the opposite direction, and
   wherein the common actuator housing is common for both actuating devices and rotatably arranged with respect to the clutch housing, wherein the actuator housing is radially supported on a gear unit housing of the gear unit and is rotatably supported.

2. The dual clutch according to claim 1, wherein the actuating devices act on transfer elements which directly displace the pressure plates without lever action.

3. The dual clutch according to claim 2, wherein the transfer elements are centered on the clutch housing by means of centering bolts.

4. The dual clutch according to claim 2, wherein between the actuating devices and the transfer elements actuating bearings are formed from a needle bearing or a ball bearing.

5. The dual clutch according to claim 1, wherein at least one of the two frictional clutches is a frictional clutch which is forcibly pressed dosed.

6. The dual clutch according to claim 5, wherein between the clutch housing or the contact pressure plate and the pressure plate is arranged an axially acting energy storage, wherein the energy storage displaces the actuating device which is not under load axially in a position of rest with the frictional clutch being open.

7. The dual clutch according to claim 6, wherein the energy storage is formed of reinforced plate springs which are distributed over the circumference.

8. The dual clutch according to claim 1, wherein the two actuating devices are formed of slave cylinders with annular pistons introduced into the actuator housing provided with pressure chambers.

9. The dual clutch according to claim 8, wherein the annular pistons in the pressure chambers are accommodated so as to be not rotatable.

10. The dual clutch according to claim 8, wherein the annular pistons are arranged on the same diameter.

11. The dual clutch according to claim 8, wherein a transfer of pressure medium for actuating the slave cylinders takes place from radially outwardly by means of a supply part.

12. The dual clutch according to claim 11, wherein the supply part is fastened to the gear housing.

13. The dual clutch according to claim 11, wherein the supply part has axially aligned openings which are connectable with corresponding pressure connections of the actuator housing.

14. The dual clutch according to claim 13, wherein the connection of the openings is effected by means of pipe sections which are sealed relative to the pressure connections.

15. The dual clutch according to claim 13, wherein the openings are arranged on the same diameter as the axial projection of the actuator housing for supporting the dual clutch at the gear housing.

16. The dual clutch according to claim 15, wherein at least one axial projection of the actuator housing axially engages over a projection with the openings of the supply part for support at the gear housing.

17. The dual clutch according to claim 16, wherein the projections support in the circumferential direction for supporting the torque between the actuator housing and the gear housing.

18. The dual clutch according to claim 13, wherein a torque support of the actuator housing relative to the gear housing is effected by the pipe sections.

19. The dual clutch according to claim 8, wherein the annular pistons are received in the pressure chamber with play.

20. The dual clutch according to claim 1, wherein the pipe sections have a receiving play in the openings and/or pressure connections of the actuator housing.

21. The dual clutch according to claim 1, wherein the actuator housing is non rotatably connected to the clutch housing and the actuating devices constructed as slave cylinders arranged in the actuator housing, wherein a pressure medium used for actuating annular pistons received in pressure chambers of the actuator housing is introduced by means of a rotary connection from a gear housing of the gear unit into the actuator housing.

22. The dual clutch according to claim 21, wherein the actuator housing is divided in two parts.

23. The dual clutch according to claim 21, wherein the transfer elements which act directly on annular pistons and the pressure plates are constructed as a single piece.

24. The dual clutch according to claim 23, wherein the transfer elements have in the area of the annular pistons integrally formed seals for sealing relative to the pressure chambers.

25. The dual clutch according to claim 21, wherein the dual clutch is supported by means of a fixed bearing on one of the gear unit input shafts of the gear unit and by means of a loose bearing on the other gear unit input shaft constructed as a hollow shaft.

26. A dual clutch, comprising: two frictional clutches driven by a drive unit, with a common clutch housing and a contact pressure plate with two frictional surfaces fixedly connected to the clutch housing, and two axially displaceable pressure plates each facing one of the frictional surfaces,
   wherein between each of the pressure plates and the contact pressure plate, frictional linings of a respective clutch disk are non-rotatably connected to a respective gear unit input shaft of a gear unit,
   an actuating system having actuating devices corresponding to each respective clutch disk for forming a frictional engagement between the each of the pressure plates and the frictional linings of the respective clutch disk by axially acting on the pressure plates,
   wherein the actuating system is axially fixedly received by means of a common actuator housing relative to the clutch housing, the actuator housing includes both actuating devices and the actuating devices are axially effective in the opposite direction, wherein between the actuating devices and the transfer elements actuating bearings are formed, and wherein the actuating bearings and a support bearing receiving the actuator housing at the clutch housing are accommodated in an annular space.

27. The dual clutch according to claim 26, wherein the actuating system has an actuator housing common for both actuating devices and rotatably arranged with respect to the clutch housing, wherein the actuator housing is radially supported on a gear unit housing of the gear unit and is rotatably supported.

28. The dual clutch according to claim 26, wherein a fluid used in the annular space for lubrication and cooling is circulated in an outer cooling cycle.

29. The dual clutch according to claim 28, wherein the cooling agent is skimmed in the annular space radially outwardly, is supplied via the actuator housing to an outer cooling zone, and is returned to the annular space after being received by the actuator housing.

30. The dual clutch according to claim 28, wherein the cooling cycle extends through the gear housing.

31. A dual clutch, comprising: two frictional clutches driven by a drive unit, with a common clutch housing and a contact pressure plate with two frictional surfaces fixedly connected to the clutch housing, and two axially displaceable pressure plates each facing one of the frictional surfaces,
   wherein between each of the pressure plates and the contact pressure plate, frictional linings of a respective clutch disk are non-rotatably connected to a respective gear unit input shaft of a gear unit,
   an actuating system having actuating devices corresponding to each respective clutch disk for forming a frictional engagement between the each of the pressure plates and the frictional linings of the respective clutch disk by axially acting on the pressure plates,
   wherein the actuating system is axially fixedly received by means of a common actuator housing relative to the clutch housing, the actuator housing includes both actuating devices and the actuating devices are axially effective in the opposite direction, the two actuating devices being formed of slave cylinders with annular pistons introduced into the actuator housing provided with pressure chambers, the annular pistons being received in the pressure chamber with play, and wherein at least one annular piston has a wiper ring which is axially spaced from a sealing lip.

32. The dual clutch according to claim 31, wherein between the sealing lip and the wiper ring is provided an opening.

33. The dual clutch according to claim 32, wherein the opening is connected to a gear sump of the gear unit.

34. A dual clutch, comprising: two frictional clutches driven by a drive unit, with a common clutch housing and a contact pressure plate with two frictional surfaces fixedly connected to the clutch housing, and two axially displaceable pressure plates each facing one of the frictional surfaces,
   wherein between each of the pressure plates and the contact pressure plate, frictional linings of a respective clutch disk are non-rotatably connected to a respective gear unit input shaft of a gear unit,
   an actuating system having actuating devices corresponding to each respective clutch disk for forming a frictional engagement between the each of the pressure plates and the frictional linings of the respective clutch disk by axially acting on the pressure plates,
   wherein the actuating system is axially fixedly received by means of a common actuator housing relative to the clutch housing the actuator housing includes both actuating devices and the actuating devices are axially effective in the opposite direction, wherein the pressure plate arranged between drive unit and contact pressure plate is actuated by a transfer element which extends outside of the clutch housing over the contact pressure plate.

35. A dual clutch, comprising: two frictional clutches driven by a drive unit, with a common clutch housing and a contact pressure plate with two frictional surfaces fixedly connected to the clutch housing, and two axially displaceable pressure plates each facing one of the frictional surfaces,
   wherein between each of the pressure plates and the contact pressure plate, frictional linings of a respective clutch disk are non-rotatably connected to a respective gear unit input shaft of a gear unit,
   an actuating system having actuating devices corresponding to each respective clutch disk for forming a frictional engagement between the each of the pressure plates and the frictional linings of the respective clutch disk by axially acting on the pressure plates,
   wherein the actuating system is axially fixedly received by means of a common actuator housing relative to the clutch housing, the actuator housing includes both actuating devices and the actuating devices are axially effective in the opposite direction,
   wherein the actuator housing is non rotatably connected to the clutch housing and the actuating devices constructed as slave cylinders arranged in the actuator housing, wherein a pressure medium used for actuating annular pistons received in pressure chambers of the actuator housing is introduced by means of a rotary connection from a gear housing of the gear unit into the actuator housing, and wherein the slave cylinders are arranged radially one above the other.

36. A dual clutch, comprising: two frictional clutches driven by a drive unit, with a common clutch housing and a contact pressure plate with two frictional surfaces fixedly connected to the clutch housing, and two axially displaceable pressure plates each facing one of the frictional surfaces, wherein between each of the pressure plates and the contact pressure plate, frictional linings of a respective clutch disk are non-rotatably connected to a respective gear unit input shaft of a gear unit, an actuating system having actuating devices corresponding to each respective clutch disk for forming a frictional engagement between the each of the pressure plates and the frictional linings of the respective clutch disk by axially acting on the pressure plates, wherein the actuating system is axially fixedly received by means of a common actuator housing relative to the clutch housing, the actuator housing includes both actuating devices and the actuating devices are axially effective in the opposite direction, wherein the actuator housing is non rotatably connected to the clutch housing and the actuating devices constructed as slave cylinders arranged in the actuator housing, wherein a pressure medium used for actuating annular pistons received in pressure chambers of the actuator housing is introduced by means of a rotary connection from a gear housing of the gear unit into the actuator housing, and wherein a centrifugal oil chamber arranged in parallel and filled with pressure medium is assigned to at least one pressure chamber.

37. A dual clutch, comprising: two frictional clutches driven by a drive unit, with a common clutch housing and a contact pressure plate with two frictional surfaces fixedly connected to the clutch housing, and two axially displaceable pressure plates each facing one of the frictional surfaces, wherein between each of the pressure plates and the contact pressure plate, frictional linings of a respective clutch disk are non-rotatably connected to a respective gear unit input shaft of a gear unit, an actuating system having actuating devices corresponding to each respective clutch disk for forming a frictional engagement between the each of the pressure plates and the frictional linings of the respective clutch disk by axially acting on the pressure plates, wherein the actuating system is axially fixedly received by means of a common actuator housing relative to the clutch housing, the actuator housing includes both actuating devices and the actuating devices are axially effective in the opposite direction, wherein the clutch housing is formed from a drive-side housing part and a gear unit side housing part, wherein both housing parts are fixedly connected to the contact pressure plate, the housing part on the drive side which is axially fixed on the drive side and the housing part on the gear side which contains the pressure plate and the contact pressure plates are pre-assembled on the gear unit side, and the housing parts are connected to each other during the assembly of drive unit and gear unit.

\* \* \* \* \*